US010810251B2

United States Patent
Frank

(10) Patent No.: US 10,810,251 B2
(45) Date of Patent: Oct. 20, 2020

(54) SYSTEMS AND METHODS FOR SPATIAL THUMBNAILS AND COMPANION MAPS FOR MEDIA OBJECTS

(71) Applicant: NOKIA TECHNOLOGIES OY, Espoo (FI)

(72) Inventor: John R. Frank, Cambridge, MA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 418 days.

(21) Appl. No.: 15/628,097

(22) Filed: Jun. 20, 2017

(65) Prior Publication Data

US 2017/0351672 A1 Dec. 7, 2017

Related U.S. Application Data

(63) Continuation of application No. 15/226,155, filed on Aug. 2, 2016, now Pat. No. 9,684,655, which is a
(Continued)

(51) Int. Cl.
*G06F 17/30* (2006.01)
*G06F 16/48* (2019.01)
(Continued)

(52) U.S. Cl.
CPC .............. *G06F 16/48* (2019.01); *G06F 16/00* (2019.01); *G06F 16/29* (2019.01); *G06F 16/40* (2019.01);
(Continued)

(58) Field of Classification Search
CPC .... G06F 17/30; G06F 16/48; G06F 17/30038; G06F 17/30864; G06F 17/30017;
(Continued)

(56) References Cited

U.S. PATENT DOCUMENTS

| 5,032,989 A | 7/1991 | Tornetta |
| 5,278,980 A | 1/1994 | Pedersen et al. |

(Continued)

FOREIGN PATENT DOCUMENTS

| EP | 1 426 876 A | 6/2004 |
| GB | 2 364 225 A | 1/2002 |

(Continued)

OTHER PUBLICATIONS

Beard and Sharma; Multidimensional ranking for data in digital spatial libraraies; Int. J. Digit. Libr. 1; pp. 153-160 (1997).
(Continued)

*Primary Examiner* — Andrea C Leggett
(74) *Attorney, Agent, or Firm* — Alston & Bird LLP

(57) ABSTRACT

Under one aspect, a computer-implemented method of displaying information about a media object, the media object being associated with location-related content corresponding to a location, includes receiving a request to display a representation of the media object; in response to the request, obtaining a summary of the media object; in response to the request, obtaining a spatial thumbnail of the media object, the spatial thumbnail comprising an image of a spatial domain encompassing the location; and simultaneously displaying both the summary of the media object and the spatial thumbnail on a visual display.

20 Claims, 7 Drawing Sheets

Related U.S. Application Data continuation of application No. 11/705,368, filed on Feb. 12, 2007, now Pat. No. 9,411,896.

(60) Provisional application No. 60/772,088, filed on Feb. 10, 2006.

(51) Int. Cl.

| | | |
|---|---|---|
| *G06F 16/00* | (2019.01) | |
| *G06F 16/29* | (2019.01) | |
| *G06F 16/40* | (2019.01) | |
| *G06F 16/58* | (2019.01) | |
| *G06F 16/438* | (2019.01) | |
| *G06F 16/951* | (2019.01) | |
| *G06F 16/9537* | (2019.01) | |

(52) U.S. Cl.
CPC ............ *G06F 16/438* (2019.01); *G06F 16/58* (2019.01); *G06F 16/951* (2019.01); *G06F 16/9537* (2019.01)

(58) Field of Classification Search
CPC ........ G06F 16/951; G06F 16/29; G06F 16/58; G06F 16/9537
See application file for complete search history.

(56) References Cited

U.S. PATENT DOCUMENTS

| | | |
|---|---|---|
| 5,623,541 A | 4/1997 | Boyle et al. |
| 5,659,732 A | 8/1997 | Kirsch |
| 5,664,115 A | 9/1997 | Fraser |
| 5,668,897 A | 9/1997 | Stolfo |
| 5,761,328 A | 6/1998 | Solberg et al. |
| 5,761,538 A | 6/1998 | Hull et al. |
| 5,764,799 A | 6/1998 | Hong et al. |
| 5,778,362 A | 7/1998 | Deerwester et al. |
| 5,802,361 A | 9/1998 | Wang et al. |
| 5,813,005 A | 9/1998 | Tsuchida et al. |
| 5,839,088 A | 11/1998 | Hancock et al. |
| 5,845,278 A | 12/1998 | Kirsch et al. |
| 5,852,810 A | 12/1998 | Sotiroff et al. |
| 5,856,060 A | 1/1999 | Kawamura et al. |
| 5,870,559 A | 2/1999 | Leshem et al. |
| 5,878,126 A | 3/1999 | Velamuri et al. |
| 5,893,093 A | 4/1999 | Wills |
| 5,920,856 A | 7/1999 | Syeda-Mahmood |
| 5,930,474 A | 7/1999 | Dunworth et al. |
| 5,958,008 A | 9/1999 | Pogrebisky et al. |
| 5,960,447 A | 9/1999 | Holt et al. |
| 5,961,571 A | 10/1999 | Gorr et al. |
| 5,961,572 A | 10/1999 | Craport et al. |
| 5,963,956 A | 10/1999 | Smartt |
| 5,978,747 A | 11/1999 | Craport et al. |
| 5,978,804 A | 11/1999 | Dietzman |
| 5,991,754 A | 11/1999 | Raitto et al. |
| 5,991,781 A | 11/1999 | Nielsen |
| 6,035,297 A | 3/2000 | Van Huben et al. |
| 6,052,691 A | 4/2000 | Ardoin et al. |
| 6,057,842 A | 5/2000 | Knowlton et al. |
| 6,070,157 A | 5/2000 | Jacobson et al. |
| 6,092,076 A | 7/2000 | McDonough et al. |
| 6,133,913 A | 10/2000 | White et al. |
| 6,144,962 A | 11/2000 | Weinberg et al. |
| 6,148,260 A | 11/2000 | Musk et al. |
| 6,148,289 A | 11/2000 | Virdy |
| 6,151,624 A | 11/2000 | Teare et al. |
| 6,184,823 B1 | 2/2001 | Smith et al. |
| 6,202,065 B1 | 3/2001 | Wills |
| 6,219,055 B1 | 4/2001 | Bhargava et al. |
| 6,233,618 B1 | 5/2001 | Shannon |
| 6,236,768 B1 | 5/2001 | Rhodes et al. |
| 6,237,006 B1 | 5/2001 | Weinberg et al. |
| 6,240,410 B1 | 5/2001 | Wical |
| 6,240,413 B1 | 5/2001 | Learmont |
| 6,249,252 B1 | 6/2001 | Dupray |
| 6,266,053 B1 | 7/2001 | French et al. |
| 6,269,368 B1 | 7/2001 | Diamond |
| 6,275,610 B1 | 8/2001 | Hall et al. |
| 6,282,540 B1 | 8/2001 | Goldensher et al. |
| 6,295,528 B1 | 9/2001 | Marcus et al. |
| 6,341,310 B1 | 1/2002 | Leshem et al. |
| 6,343,139 B1 | 1/2002 | Finkelstein et al. |
| 6,343,290 B1 | 1/2002 | Cossins et al. |
| 6,366,851 B1 | 4/2002 | Chojnacki et al. |
| 6,377,961 B1 | 4/2002 | Ryu et al. |
| 6,397,228 B1 | 5/2002 | Lamburt et al. |
| 6,411,293 B1 | 6/2002 | Sakamoto et al. |
| 6,470,287 B1 | 10/2002 | Smartt |
| 6,470,383 B1 | 10/2002 | Leshem et al. |
| 6,493,711 B1 | 12/2002 | Jeffrey |
| 6,542,813 B1 | 4/2003 | Kovacs et al. |
| 6,556,990 B1 | 4/2003 | Lane |
| 6,577,714 B1 | 6/2003 | Darcie et al. |
| 6,584,459 B1 | 6/2003 | Chang et al. |
| 6,629,065 B1 | 9/2003 | Gadh et al. |
| 6,631,364 B1 | 10/2003 | Rioux et al. |
| 6,636,803 B1 | 10/2003 | Hartz, Jr. et al. |
| 6,640,145 B2 | 10/2003 | Hoffberg et al. |
| 6,701,307 B2 | 3/2004 | Himmelstein et al. |
| 6,711,585 B1 | 3/2004 | Copperman et al. |
| 6,721,728 B2 | 4/2004 | McGreevy |
| 6,731,314 B1 | 5/2004 | Cheng et al. |
| 6,741,981 B2 | 5/2004 | McGreevy |
| 6,823,333 B2 | 11/2004 | McGreevy |
| 6,850,252 B1 | 2/2005 | Hoffberg |
| 6,853,389 B1 | 2/2005 | Ikeda et al. |
| 6,859,800 B1 | 2/2005 | Roche et al. |
| 6,862,586 B1 | 3/2005 | Kreulen et al. |
| 6,871,140 B1 | 3/2005 | Florance et al. |
| 6,934,710 B1 | 8/2005 | Mills |
| 7,007,228 B1 | 2/2006 | Carro et al. |
| 7,017,285 B2 | 3/2006 | Lakic |
| 7,024,403 B2 | 4/2006 | Kyler |
| 7,035,869 B2 | 4/2006 | Smartt |
| 7,065,532 B2 | 6/2006 | Elder et al. |
| 7,092,969 B2 | 8/2006 | Meek et al. |
| 7,107,285 B2 | 9/2006 | von Kaenel et al. |
| 7,117,199 B2 | 10/2006 | Frank et al. |
| 7,143,344 B2 | 11/2006 | Parker et al. |
| 7,163,739 B2 | 1/2007 | Koike et al. |
| 7,181,502 B2 | 2/2007 | Incertis |
| 7,233,942 B2 | 6/2007 | Nye et al. |
| 7,246,116 B2 | 7/2007 | Barsness et al. |
| 7,254,580 B1 | 8/2007 | Gharachorloo et al. |
| 7,274,332 B1 | 9/2007 | Dupray |
| 7,310,633 B1 | 12/2007 | Wang et al. |
| 7,325,201 B2 | 1/2008 | Ferrari et al. |
| 7,353,113 B2 | 4/2008 | Sprague et al. |
| 7,373,246 B2 | 5/2008 | O'Clair |
| 7,393,924 B2 | 7/2008 | Vitaliano et al. |
| 7,403,939 B1 | 7/2008 | Virdy |
| 7,411,204 B2 | 8/2008 | Appleby et al. |
| 7,428,528 B1 | 9/2008 | Ferrari et al. |
| 7,437,703 B2 | 10/2008 | Wu |
| 7,473,843 B2 | 1/2009 | Wang et al. |
| 7,483,025 B2 | 1/2009 | Roy et al. |
| 7,483,881 B2 | 1/2009 | Egnor et al. |
| 7,522,760 B1 | 4/2009 | Will et al. |
| 7,539,693 B2 | 5/2009 | Frank et al. |
| 7,596,581 B2 | 9/2009 | Frank et al. |
| 7,676,452 B2 | 3/2010 | Doganata et al. |
| 7,698,059 B2 | 4/2010 | O'Clair |
| 7,698,336 B2 | 4/2010 | Nath |
| 7,720,723 B2 | 5/2010 | Dicker et al. |
| 7,720,806 B2 | 5/2010 | Piedmonte |
| 7,756,753 B1 | 7/2010 | McFarland |
| 7,792,883 B2 | 9/2010 | Buron et al. |
| 7,908,280 B2 | 3/2011 | Frank et al. |
| 2001/0011270 A1 | 8/2001 | Himmelstein et al. |
| 2001/0011365 A1 | 8/2001 | Helfman |
| 2001/0014185 A1 | 8/2001 | Chitradon et al. |
| 2001/0014868 A1 | 8/2001 | Herz et al. |
| 2002/0000999 A1 | 1/2002 | McCarty et al. |

(56) References Cited

U.S. PATENT DOCUMENTS

| | | |
|---|---|---|
| 2002/0016796 A1 | 2/2002 | Hurst et al. |
| 2002/0032677 A1 | 3/2002 | Morgenthaler et al. |
| 2002/0055924 A1 | 5/2002 | Liming |
| 2002/0065844 A1 | 5/2002 | Robinson et al. |
| 2002/0076099 A1 | 6/2002 | Sakamoto et al. |
| 2002/0078035 A1 | 6/2002 | Frank et al. |
| 2002/0082901 A1 | 6/2002 | Dunning et al. |
| 2002/0107918 A1 | 8/2002 | Shaffer et al. |
| 2002/0126905 A1 | 9/2002 | Suzuki et al. |
| 2002/0151992 A1 | 10/2002 | Hoffberg et al. |
| 2002/0161736 A1 | 10/2002 | Beygelzimer et al. |
| 2002/0188599 A1 | 12/2002 | McGreevy |
| 2003/0001900 A1 | 1/2003 | Cabanes et al. |
| 2003/0004802 A1 | 1/2003 | Callegari |
| 2003/0004914 A1 | 1/2003 | McGreevy |
| 2003/0005053 A1 | 1/2003 | Novaes |
| 2003/0009458 A1 | 1/2003 | Nakano et al. |
| 2003/0037048 A1 | 2/2003 | Kabra et al. |
| 2003/0056175 A1 | 3/2003 | Fujihara |
| 2003/0078913 A1 | 4/2003 | McGreevy |
| 2003/0097357 A1 | 5/2003 | Ferrari et al. |
| 2003/0105682 A1 | 6/2003 | Dicker et al. |
| 2003/0187867 A1 | 10/2003 | Smartt |
| 2004/0078750 A1 | 4/2004 | Frank |
| 2004/0093328 A1 | 5/2004 | Damle |
| 2004/0095376 A1 | 5/2004 | Graham et al. |
| 2004/0100506 A1 | 5/2004 | Shiota et al. |
| 2004/0117358 A1 | 6/2004 | von Kaenel et al. |
| 2004/0119759 A1 | 6/2004 | Barros |
| 2004/0139400 A1 | 7/2004 | Allam et al. |
| 2004/0162675 A1 | 8/2004 | Moon et al. |
| 2004/0225635 A1 | 11/2004 | Toyama et al. |
| 2004/0236730 A1 | 11/2004 | Frank |
| 2005/0004910 A1 | 1/2005 | Trepess |
| 2005/0008849 A1 | 1/2005 | Kagami et al. |
| 2005/0091193 A1 | 4/2005 | Frank et al. |
| 2005/0091209 A1 | 4/2005 | Frank et al. |
| 2005/0096991 A1 | 5/2005 | Main, II et al. |
| 2005/0108001 A1 | 5/2005 | Aarskog |
| 2005/0108213 A1 | 5/2005 | Riise et al. |
| 2005/0108224 A1 | 5/2005 | Silverbrook et al. |
| 2005/0119824 A1 | 6/2005 | Rasmussen et al. |
| 2005/0149576 A1 | 7/2005 | Marmaros et al. |
| 2005/0193003 A1 | 9/2005 | Popovici |
| 2005/0198008 A1 | 9/2005 | Adler |
| 2005/0222879 A1 | 10/2005 | Dumas et al. |
| 2005/0246310 A1 | 11/2005 | Chang et al. |
| 2005/0270311 A1 | 12/2005 | Rasmussen et al. |
| 2005/0278378 A1 | 12/2005 | Frank |
| 2005/0278616 A1 | 12/2005 | Eller |
| 2006/0004752 A1 | 1/2006 | Harel et al. |
| 2006/0004797 A1 | 1/2006 | Riise et al. |
| 2006/0010100 A1 | 1/2006 | McAvoy et al. |
| 2006/0015722 A1 | 1/2006 | Rowan et al. |
| 2006/0026170 A1 | 2/2006 | Kreitler et al. |
| 2006/0036588 A1 | 2/2006 | Frank et al. |
| 2006/0085234 A1 | 4/2006 | Cagan |
| 2006/0117067 A1 | 6/2006 | Wright et al. |
| 2006/0122794 A1 | 6/2006 | Sprague et al. |
| 2006/0149774 A1 | 7/2006 | Egnor |
| 2006/0155679 A1 | 7/2006 | Kothuri et al. |
| 2006/0159367 A1 | 7/2006 | Zeineh et al. |
| 2006/0174209 A1* | 8/2006 | Barros ................ G06F 3/0483 715/764 |
| 2006/0179453 A1 | 8/2006 | Kadie et al. |
| 2006/0184519 A1 | 8/2006 | Smartt |
| 2006/0200259 A1 | 9/2006 | Hoffberg et al. |
| 2006/0200260 A1 | 9/2006 | Hoffberg et al. |
| 2006/0217878 A1 | 9/2006 | Bramley |
| 2006/0224587 A1 | 10/2006 | Zamir et al. |
| 2006/0238379 A1 | 10/2006 | Kimchi et al. |
| 2006/0242126 A1 | 10/2006 | Fitzhugh |
| 2006/0271281 A1 | 11/2006 | Ahn et al. |
| 2007/0011150 A1 | 1/2007 | Frank |
| 2007/0016562 A1 | 1/2007 | Cooper |
| 2007/0018953 A1 | 1/2007 | Kipersztok |
| 2007/0073748 A1 | 3/2007 | Barney |
| 2007/0078768 A1 | 4/2007 | Dawson |
| 2007/0130112 A1 | 6/2007 | Lin |
| 2007/0143318 A1 | 6/2007 | Hendrey et al. |
| 2007/0156677 A1 | 7/2007 | Szabo |
| 2007/0179932 A1 | 8/2007 | Piaton |
| 2007/0186166 A1 | 8/2007 | Anderson et al. |
| 2007/0192300 A1 | 8/2007 | Reuther et al. |
| 2007/0198495 A1 | 8/2007 | Buron et al. |
| 2007/0198951 A1 | 8/2007 | Frank |
| 2007/0219968 A1 | 9/2007 | Frank |
| 2007/0233692 A1 | 10/2007 | Lisa et al. |
| 2007/0239692 A1 | 10/2007 | McBride |
| 2007/0266337 A1 | 11/2007 | Friedland et al. |
| 2007/0288160 A1 | 12/2007 | Ebert |
| 2007/0288431 A1 | 12/2007 | Reitter et al. |
| 2007/0288437 A1 | 12/2007 | Xia |
| 2007/0294233 A1 | 12/2007 | Sheu et al. |
| 2008/0005101 A1 | 1/2008 | Chandra |
| 2008/0010262 A1 | 1/2008 | Frank |
| 2008/0010273 A1 | 1/2008 | Frank |
| 2008/0010605 A1 | 1/2008 | Frank |
| 2008/0033935 A1 | 2/2008 | Frank |
| 2008/0033936 A1 | 2/2008 | Frank |
| 2008/0033944 A1 | 2/2008 | Frank |
| 2008/0040336 A1 | 2/2008 | Frank |
| 2008/0052638 A1 | 2/2008 | Frank et al. |
| 2008/0056538 A1 | 3/2008 | Frank |
| 2008/0059452 A1 | 3/2008 | Frank |
| 2008/0065685 A1 | 3/2008 | Frank |
| 2008/0068380 A1 | 3/2008 | McAvoy et al. |
| 2008/0074423 A1 | 3/2008 | Gan et al. |
| 2008/0086356 A1 | 4/2008 | Glassman et al. |
| 2008/0126191 A1 | 5/2008 | Schiavi |
| 2008/0131003 A1 | 6/2008 | Bober |
| 2008/0140348 A1 | 6/2008 | Frank |
| 2008/0215524 A1 | 9/2008 | Fuchs et al. |
| 2009/0119255 A1 | 5/2009 | Frank et al. |
| 2009/0132316 A1 | 5/2009 | Florance et al. |
| 2009/0183097 A1 | 7/2009 | Bayiates |
| 2009/0299975 A1 | 12/2009 | Coifman et al. |
| 2010/0106752 A1 | 4/2010 | Eckhardt, III et al. |
| 2010/0188210 A1 | 7/2010 | Howard et al. |
| 2013/0132375 A1 | 5/2013 | Jones et al. |

FOREIGN PATENT DOCUMENTS

| | | |
|---|---|---|
| WO | WO 2005/114484 A1 | 12/2005 |
| WO | WO 2007/002800 A2 | 1/2007 |

OTHER PUBLICATIONS

Brief Communication regarding Oral Proceedings for European Application No. 06 774 239.5 dated Nov. 15, 2016, 5 pages.

Ceseli et al.; "Modeling and Assessing Interference Exposure in Encrypted Databases"; ACM Transactions on Information and System Security; vol. 8, No. 1; Feb. 2005; pp. 119-152.

Chen et al., "The BioPortal Project: A National Center of Excellence for Infectious Disease Informatics"; Proceedings of the 2006 International Conference on Digital Government Research; May 21-24, 2006; pp. 373-374.

Christel, M.G. et al.; "Interactive Maps for a Digital Video Library"; IEEE Multimedia; IEEE Service Center; New York; vol. 7; No. 1; Jan. 2000; pp. 60-67; XP000908490.

Clifton, et al.; "GeoNODE: An End-to-End System from Research Components", the 17th International Conference on Data Engineering, Heidelberg, Germany; Apr. 2-6, 2001; 3 pages.

Clough, Paul: "Extracting Metadata for Spatially-Aware Information Retrieval on the Internet"; In: "Proceedings of the 2005 workshop on Geographic information retrieval" 2005; Association for Computing Machinery; New York, US; XP002530069 (454406-ISR).

Decision to Refuse Application for European Application No. 06 774 239.5 dated Dec. 14, 2016, 19 pages.

Duhring, "Geospatial Archive and Exploitation System"; SGI White Paper; pp. 1-12 (Dec. 2001); 14 pages.

(56) References Cited

OTHER PUBLICATIONS

European Office Action for corresponding EP app. No. 01925106.5-2201 dated Aug. 9, 2007, pp. 1-5.
European Office Action for corresponding EP app. No. 06 774 239.5-1952 dated Jul. 16, 2015.
European Office Action for corresponding EP app. No. 06 774 239.5-1952 dated May 11, 2016.
European Office Action for corresponding EP app. No. 06 774 239.5-2201 dated Feb. 23, 2011.
European Patent Office, Supplementary Partial European Search Report for Application No. EP 01925106.5-2001/US0140173, dated Jun. 3, 2005, 2 pages.
Excerpts from Texis Tutorial; URL http://www.thunderstone.com/texis/site/demos/map/; 9 pages.
Final Office Action for U.S. Appl. No. 09/791,533, dated Jan. 14, 2004.
Final Office Action for U.S. Appl. No. 09/791,533, dated May 31, 2005.
Final Office Action for U.S. Appl. No. 11/705,269, dated Jun. 11, 2010.
Final Office Action for U.S. Appl. No. 11/705,368, dated Dec. 30, 2010.
Final Office Action for U.S. Appl. No. 11/705,368, dated May 20, 2010.
Final Office Action for U.S. Appl. No. 11/818,066, dated Apr. 1, 2010.
Final Office Action for U.S. Appl. No. 11/818,074, dated Apr. 29, 2010.
Final Office Action for U.S. Appl. No. 11/834,538, dated May 13, 2010.
Final Office Action for U.S. Appl. No. 11/834,563, dated May 13, 2010.
Final Office Action for U.S. Appl. No. 11/834,566, dated May 27, 2010.
Final Office Action for U.S. Appl. No. 11/834,598, dated Jul. 20, 2010.
Final Office Action for U.S. Appl. No. 11/834,598, dated Jun. 23, 2011.
Final Office Action for U.S. Appl. No. 11/834,600, dated Aug. 31, 2010.
Final Office Action for U.S. Appl. No. 11/834,600, dated Jun. 29, 2011.
Final Office Action for U.S. Appl. No. 11/857,987, dated Mar. 7, 2011.
Final Office Action for U.S. Appl. No. 11/857,987, dated May 28, 2010.
Final Office Action for U.S. Appl. No. 11/963,451, dated Jun. 18, 2015.
Final Office Action for U.S. Appl. No. 11/963,451, dated Sep. 21, 2011.
Fu, Gaihua et al.; "Building a Geographical Ontology for Intelligence Spatial Search on the Web"; Proceedings of the lasted International Conference on Databases and Applications (DBA2005); Feb. 14, 2005; XP002530039.
Fu, Gaihua et al.; "Ontology-Based Spatial Query Expansion in Information Retrieval"; In "Lecture Notes in Computer Science 3761: On the Move to Meaningful Internet Systems 2005: CoopIS, DOA, and ODBASE"; Oct. 11, 2005, Springer, Berlin, Germany, XP019022991; pp. 1466-1482.
Gaede, V.; "Multidimensional Access Methods"; ACM Computing Surveys; vol. 30, No. 2; Jun. 1998; pp. 170-231.
Gueting R H: "An Introduction to Spatial Database Systems" VLDB Journal, vol. 3, No. 4; Oct. 1994; pp. 357-399.
Hill and Rasmussen; "Geographic Indexing Terms as Spatial Indicators"; in Studies in Multimedia: State-of-the-Art Solutions in Multimedia and Hypertext; Stone, et al.; (Eds.), Medford, NJ; Learned Information, pp. 9-20, 1992.
Hill; "Spatial Access to, and Display of, Global Change Data; Avenues for Libraries"; Proceedings of the Data Processing Clinic Geographic Information Systems and Libararies: Patrons, Maps and Spatial Information; pp. 125-150, 1995.
Hyland et al.; "GEONODE: Visualizing New in Geospatial Context"; Federal Data Mining Symposium and Exposition '99; AFCEA, Mar. 9-10, 1999; Washington, D.C., 12 pages.
International Preliminary Examination Report for corresponding International Application No. PCT/US01/40173, dated Nov. 15, 2001.
International Preliminary Report on Patentability for corresponding International Application No. PCT/US2006/0025296, dated Jan. 9, 2008, pp. 1-9.
International Preliminary Report on Patentability for corresponding International Application No. PCT/US2007/003769, dated Aug. 12, 2008.
International Preliminary Report on Patentability for corresponding International Application No. PCT/US2007/013807, dated Dec. 16, 2008, pp. 1-10.
International Preliminary Report on Patentability for corresponding International Application No. PCT/US2007/075289, dated Feb. 10, 2009, pp. 1-8.
International Preliminary Report on Patentability for corresponding International Application No. PCT/US2007/075294, dated Feb. 10, 2009, pp. 1-6.
International Preliminary Report on Patentability for corresponding International Application No. PCT/US2007/083238, dated May 5, 2009, pp. 1-7.
International Search Report and Written Opinion from International Application No. PCT/US2007/088737, dated Sep. 11, 2009.
International Search Report for International Application No. PCT/US01/40173, dated Jun. 28, 2001.
International Search Report for International Application No. PCT/US2006/025296 dated Feb. 9, 2007, 6 pages.
International Search Report for International Application No. PCT/US2007/003769 dated Aug. 2, 2007, 4 pages.
International Search Report for International Application No. PCT/US2007/013807 dated Oct. 1, 2008, 8 pages.
International Search Report for International Application No. PCT/US2007/075266 dated Jan. 14, 2008, 13 pages.
International Search Report for International Application No. PCT/US2007/075289 dated Feb. 12, 2008, 4 pages.
International Search Report for International Application No. PCT/US2007/075294 dated Feb. 6, 2008, 4 pages.
International Search Report for International Application No. PCT/US2007/083238 dated May 21, 2008, 15 pages.
Internet Website: http://bbc.co.uk/h2g2/guide, The Hitchhiker's Guide to the Galaxy, pp. 1-1, Jun. 14, 2001, 2 pages.
Internet Website: http://mapsonus.switchboard.com/bin/maps-route, Show Route, pp. 1-3, Show Map, pp. 1-2, Jun. 14, 2001, 5 pages.
Internet Website: http://www.dogpile.com, homepage, pp. 1; Dogpile Local Search, pp. 1, Jun. 14, 2001, 2 pages.
Internet Website: http://www.ismap.com, home page; Locate addresses and local services in Europe, pp. 1-2, Jun. 14, 2001, 3 pages.
Internet Website: http://www.mapblast.com, home page, Jun. 14, 2001, 1 pages.
Internet Website: http://www.mapplanet.com, home page, p. 1; Guided Tour—Introduction, p.1; Guided Tour—Navigation, p. 1; Guided Tour—Claiming a cell, p. 1: Guided Tour—Registration, p.1; Guided Tour—Signing in, p. 1; Guided Tour—Searching, p. 1; Guided Tour—Technical Requirements, p. 1, Jun. 14, 2001, 8 pages.
Internet Website: http://www.northernlight.com, home page, pp. 1-2, 2000 Press Releases, Dec. 6; pp. 1-3, 2000 Press Releases, Jan. 19, pp. 1-3, 8 pages.
Jones, et al.; "The SPIRIT Spatial Search Engine: Architecture, Ontologies and Spatial Indexing"; Lecture Notes in Computer Science; vol. 3234; 2004; pp. 125-139; XP002530038 (454406—ISR).
Keyhole Markup Language [online] [retrieved Oct. 26, 2015]. Retrieved from the Internet: <URL: http://code.google.com/apis/kml/documentation/kml_tags_21.html>. 160 pages.
Korn, "A Taxonomy of Browsing Methods: Approaches to the Lost in Concept Space Problem", University of Maryland, Department of Computer Science, 1996, 27 pages.

(56) References Cited

OTHER PUBLICATIONS

Koshman, Sherry; "Visualization-Based Information Retrieval on the Web"; May 9, 2006; vol. 28, Issue 2; Summer 2006; pp. 197-207.

Larson and Smith, "Geographic Information Retrieval and Spatial Browsing", in Geographic Information Systems and Libraries: Patrons, Maps, and Spatial Information, Papers Presented at the 1995 Clinic on Library Applications of Data Processing, pp. 1, 81-123 (1995).

Larson, et al.; "The Sequoia 2000 Electronic Repository," Digital Technical Journal, vol. 7(3), pp. 50-65 (1995).

Liu et al.; "A New Point Process Transition Density Model for Space-Time Event Prediction"; IEEE Transactions on Systems, Man, and Cybernetics: Part C: Applications and Reviews, 34(3):310-324 (2004).

Liu et al.; "Criminal Incident Prediction Using a Point-Pattern-Based Density Model", International Journal of Forecasting, 19(4):603-622 (2003).

Luo, Si et al.; "A Semisupervised Learning Method to Merge Search Engine Results"; Oct. 2003; ACM NY; vol. 21, pp. 457-491.

Maass, Henning; "Location-Aware Mobile Applications Based on Directory Services"; ACM Mobile Networks and Applications; Aug. 1998; pp. 157-173.

Mapquest, retrieved from the Internet: http://www.mapquest.com, retrieved Apr. 20, 2001, 9 pages; XP002946890.

Markowetz, Alexander et al.; Design and Implementation of a Geographic Search Engine; Jun. 16-17, 2005, 8th International Workshop on the Web and Databases (WebDB 2005), p. 1-6.

Matheson, et al., Geoparser Evalution (geoXwalk Phase III WP 4), University of Edinburgh Data Library, Aug. 2004 (9 pages).

Metacarta, "A White Paper on MetaCarta's Technology and Products", XP002463193, 2005, 24 pages.

Metacarta, "MetaCarta GTS Systems", Feb. 6, 2005, pp. 1-2, Retrieved from the Internet: URL:http://web.archive.org/web/20050206162128/www.metacarta.com/products/gts/index.html [retrieved on Feb. 18, 2011].

Metacarta, "Technology", Feb. 6, 2005, pp. 1-4, Retrieved from the Internet: URL:http://web.archive.org/web/20050206071702/www.metacarta.com/technology/index/html.

Nadeau, et al., "Unsupervised Named-Entity Recognition: Generating Gazetteers and Resolving Ambiguity", Published at the 19th Canadian Conference on Artificial Intelligence, Quebec City, Quebec, Canada; Jun. 7, 2006; NRC 48727 (13 pages).

Notice of Allowance for U.S. Appl. No. 09/791,533, dated Mar. 1, 2006.

Notice of Allowance for U.S. Appl. No. 11/705,368, dated Aug. 28, 2015.

Notice of Allowance for U.S. Appl. No. 11/705,368, dated Mar. 28, 2016.

Notice of Allowance for U.S. Appl. No. 11/818,074, dated May 2, 2011.

Notice of Allowance for U.S. Appl. No. 11/963,451 dated Nov. 10, 2015.

Notice of Allowance for U.S. Appl. No. 15/226,155 dated Jan. 3, 2017.

Office Action for Canadian Patent Application No. 2,641,986, dated Jan. 22, 2013, pp. 1-4.

Office Action for related U.S. Appl. No. 11/705,269, dated Sep. 2, 2011.

Office Action for U.S. Appl. No. 09/791,533, dated Aug. 13, 2003.
Office Action for U.S. Appl. No. 09/791,533, dated Jan. 6, 2005.
Office Action for U.S. Appl. No. 09/791,533, dated Nov. 1, 2005.
Office Action for U.S. Appl. No. 11/705,269, dated Sep. 21, 2009.
Office Action for U.S. Appl. No. 11/705,368, dated Aug. 10, 2009.
Office Action for U.S. Appl. No. 11/705,368, dated Aug. 31, 2010.
Office Action for U.S. Appl. No. 11/705,368, dated Oct. 24, 2011.
Office Action for U.S. Appl. No. 11/811,976, dated Jun. 23, 2010.
Office Action for U.S. Appl. No. 11/811,976, dated Nov. 17, 2010.
Office Action for U.S. Appl. No. 11/818,066, dated Jul. 23, 2009.
Office Action for U.S. Appl. No. 11/818,074, dated Aug. 6, 2009.
Office Action for U.S. Appl. No. 11/818,074, dated Sep. 30, 2010.
Office Action for U.S. Appl. No. 11/834,538, dated Aug. 24, 2009.
Office Action for U.S. Appl. No. 11/834,538, dated Sep. 27, 2010.
Office Action for U.S. Appl. No. 11/834,563, dated Aug. 24, 2009.
Office Action for U.S. Appl. No. 11/834,563, dated Sep. 24, 2010.
Office Action for U.S. Appl. No. 11/834,566, dated Oct. 14, 2010.
Office Action for U.S. Appl. No. 11/834,566, dated Sep. 8, 2009.
Office Action for U.S. Appl. No. 11/834,584, dated Sep. 9, 2009.
Office Action for U.S. Appl. No. 11/834,594 dated Oct. 5, 2016.
Office Action for U.S. Appl. No. 11/834,594, dated Jun. 10, 2011.
Office Action for U.S. Appl. No. 11/834,594, dated Sep. 10, 2012.
Office Action for U.S. Appl. No. 11/834,594, dated Jan. 6, 2012.
Office Action for U.S. Appl. No. 11/834,594, dated Mar. 13, 2013.
Office Action for U.S. Appl. No. 11/834,598, dated Jan. 20, 2011.
Office Action for U.S. Appl. No. 11/834,598, dated Oct. 29, 2009.
Office Action for U.S. Appl. No. 11/834,600, dated Dec. 9, 2009.
Office Action for U.S. Appl. No. 11/834,600, dated Feb. 22, 2011.
Office Action for U.S. Appl. No. 11/834,600, dated Jun. 4, 2013.
Office Action for U.S. Appl. No. 11/857,987, dated Oct. 5, 2010.
Office Action for U.S. Appl. No. 11/857,987, dated Sep. 17, 2009.
Office Action for U.S. Appl. No. 11/932,438, dated Oct. 8, 2010.
Office Action for U.S. Appl. No. 11/963,451, dated Dec. 1, 2014.
Office Action for U.S. Appl. No. 11/963,451, dated Mar. 21, 2011.
Office Action for U.S. Appl. No. 11/963,451, dated Sep. 17, 2010.
Office Action from U.S. Appl. No. 15/070,416, dated Jul. 13, 2017, 33 pages.

Office Action from U.S. Appl. No. 15/226,155 dated Aug. 25, 2016.
Ooi et al., Indexing in Spatial Databases, pp. 1-71 (1993).

Open GIS Consortium, Request for Quotation and Call for Participation in the OGC Geospatial Fusion Services Testbed Phase 1, Jun. 2000, 93 pages.

OpenLayers 3 [online] [retrieved Oct. 26, 2015]. Retrieved from the Internet: <URL: http://www.openlayers.org>. 3 pages.

Petras, et al., "Time Period Directories: A Metadata Infrastructure for Placing Events in Temporal and Geographic Context"; Proceedings of the 6th ACM. IEEE-CS Joint Conference on Digital Libraries, Jun. 2006, pp. 151-160, XP002478581.

Plazanet, et al., "Experiments with Learning Techniques for Spatial Model Enrichment and Line Generalization"; Geoinformatica 2(4):315-333 (1998).

Robertson, S.E. et al.; "Simple, proven approaches to text retrieval", Technical Report, University of Cambridge, No. 356, May 1997, pp. 1-7.

Sekine and Isahara, "IREX Project Overview"; Proceedings of the LREC 2000: 2nd International Conference on Lanugage Resources & Evaluation, Athens (2000), 6 pages.

Sester et al., "Linking Objects of Different Spatial Data Sets by Integration and Aggregation"; GeoInformatica 2:4, pp. 335-358 (1998)

Smith, T., "A Digital Library for Geographically Referenced Materials"; IEEE Computer (1996), vol. 29, pp. 54-60.

Soffer, et al.; "Integrating Symbolic Images into a Multimedia Database System using Classification and Abstraction Approaches"; VLDB Journal, 7:253-274 (1998).

Su et al.; "Morphological Models for the Collapse of Area Features in Digital Map Generalization"; GeoInformatica 2:4, pp. 359-382 (1998).

Summons to Attend Oral Proceedings for European Application No. 01 925 106.5 dated Nov. 2, 2016, 43 pages.

Summons to Attend Oral Proceedings for European Application No. 01 925 106.5 dated Nov. 30, 2016.

Summons to Attend Oral Proceedings for European Application No. 07 750 597.2 dated Dec. 23, 2016, 2 pages.

Summons to Attend Oral Proceedings for European Application No. 07 750 597.2 dated Nov. 18, 2016, 11 pages.

Summons to Attend Oral Proceedings from European Patent Application No. 06 774 239.5, dated May 11, 2016, 5 pages.

Supplementary European Search Report for corresponding EP app. No. 01925106.5-2201 dated Aug. 24, 2005, pp. 1-5.

Vilain, et al.; "Exploiting Semantic Extraction for Spatiotemporal Indexing in GeoNODE"; Published Apr. 2000, 9 pages.

Ware and Jones, "Conflict Reduction in Map Generalization Using Iterative Improvement"; GeoInformatica 2:4, pp. 383-407 (1998).

(56) References Cited

OTHER PUBLICATIONS

Weibel and Jones; "Computational Perspectives on Map Generalization"; GeoInformatica 2:4, pp. 307-314 (1998)

Woodruff, et al.; "GIPSY: Georeferenced Information Processing System"; Computer Science Division University of California; Berkley and Library and Information Studies, University of California Berkley, pp. i-iii and 1-21 (1994).

Zeng, et al., "West Nile Virus and Botulism Portal: A Case Study in Infectious Disease Informatics"; Lecture Notes in Computer Science: Intelligence and Security Informatics [online], vol. 3037/2004, Aug. 24, 2004, pp. 28-41.

Notice of Allowance for U.S. Appl. No. 15/226,155 dated Feb. 21, 2017, 6 pages.

Notice of Allowance for U.S. Appl. No. 11/834,594, dated Mar. 28, 2017, 14 pages.

\* cited by examiner

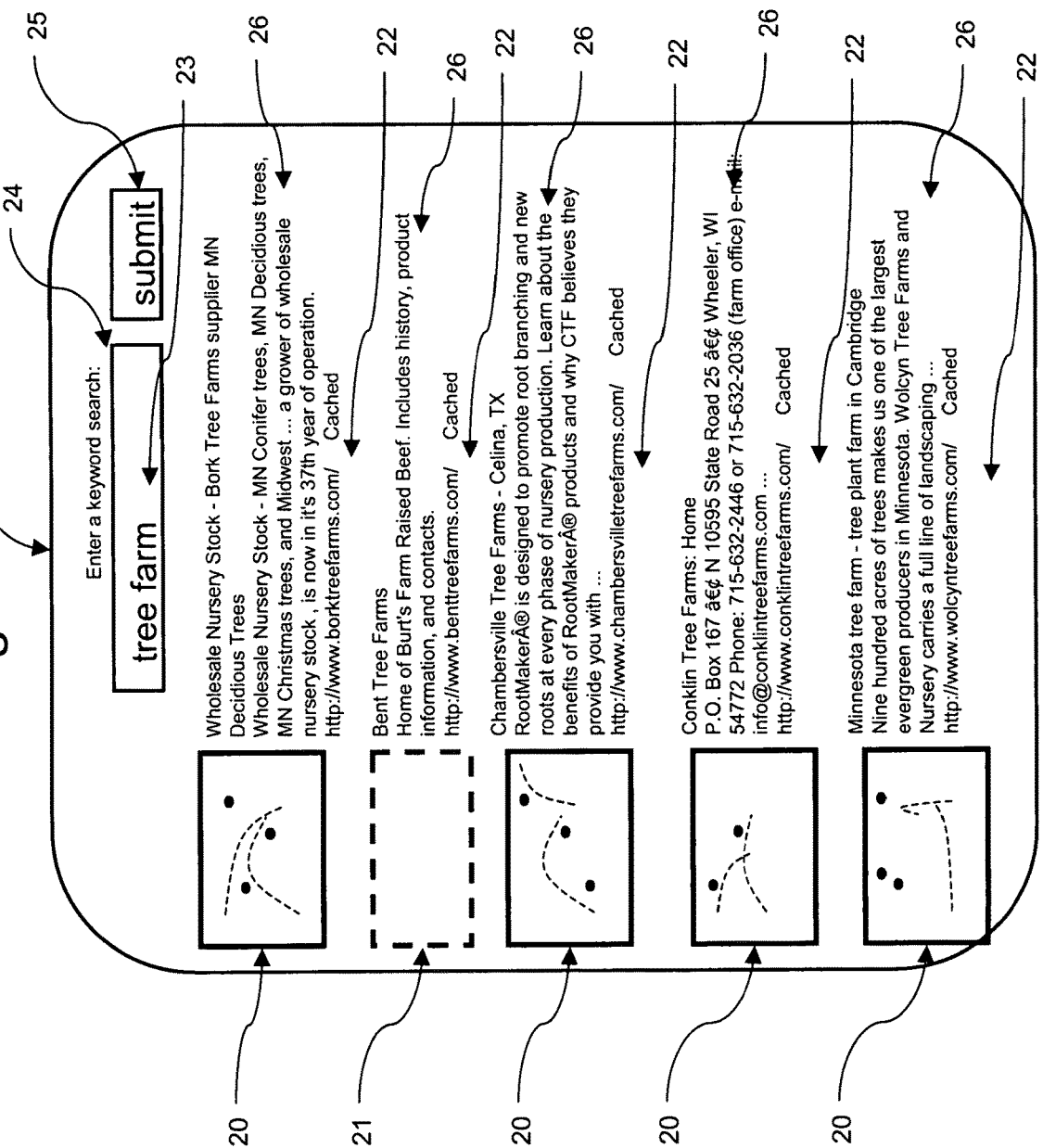

SYSTEMS AND METHODS FOR SPATIAL THUMBNAILS AND COMPANION MAPS FOR MEDIA OBJECTS

CROSS REFERENCE TO RELATED APPLICATIONS

This application is a continuation of application Ser. No. 15/226,155 filed Aug. 2, 2016, which is a continuation of application Ser. No. 11/705,368 filed Feb. 12, 2007, which claims the benefit of U.S. Provisional Patent Application No. 60/772,088, filed Feb. 10, 2006, the entire contents of which are incorporated herein by reference.

This application is related to U.S. patent application Ser. No. 11/705,269, filed Feb. 12, 2007 and entitled "Systems and Methods for Spatial Thumbnails and Companion Maps for Media Objects, the entire contents of which are incorporated herein by reference.

TECHNICAL FIELD

This application relates to media objects, and more particularly to displaying information about media objects.

BACKGROUND

Media objects are physical or electronic recordings or representations of information, thoughts, or emotions. People have created and used media objects for thousands of years. Recently, technological advancements have enabled a great proliferation of media objects and an increase in exchange of media objects amongst people. This exchange of media objects is frequently facilitated by summaries of media objects. For example, a movie may be recorded in digital form and sold over the Internet to people who wish to view the movie. Typically, the prospective movie buyer examines many possible movie choices and selects only a small number. This selection process determines the commercial success of the moviemakers. To increase the number of people who choose their movie, the moviemakers typically create "trailers" or short sequences of excerpted footage from the film to tempt people to get the entire movie. These trailers condense the much larger media object into a new media object that summarizes the larger media object. The creation of the summary can be as much an art form as the creation of the original media object.

The movie trailer concept has analogs in many forms of media objects. Without the concept of a summary, search and selection of media objects would be greatly impaired. For example, the back cover or dust jacket of a book often describes the story line, exciting attributes about the author, and praise from other people for the book's value. As another example, search engines generate short textual excerpts from the web pages and other documents that match a user's search request. These excerpts summarize the contents of the document. Image and video search engines similarly endeavor to produce summaries of the content of the media objects sought by their users.

Often, a summary is implemented in the same kind of medium as the media object that it describes, e.g. the text of a book is often summarized by text on the dust jacket, and a miniature clay figurine may summarize the gestalt of a large stone sculpture. However, this is not always true of summaries, e.g. a talk show host might verbally summarize the story line of a book, which is a textual media object. A recording of the talk show host would be a media object that summarizes the book.

A defining attribute of a summary is that it contains less than all the content of the media object. However, summaries sometimes introduce new information that is not present in the original media object. For example, a talk show host might render opinions of a book, or a movie trailer might arrange its excerpts in an order that communicates a particular idea that is not obviously present in the movie itself.

Generally, a summary is clearly associated with the media object that it summarizes. This association is often achieved by presenting the summary visually adjacent to a means of accessing the media object that it summarizes. For example, a summary generated by a search engine is usually presented near a hyperlink to the media object that the search engine is providing in response to a user's search query. As another example, the summary in a dust jacket is physically bound around the book it summarizes.

With the advent of automated analysis techniques that glean information from digital media using computer algorithms, some summaries are partially or totally generated without the aide of a human. A now-famous task in the engineering discipline of natural language processing is "automatic summary generation." Automatic summary generation is usually thought of as a text analysis process, however the resampling and resealing of an image to generate a smaller version of an image is another type of automatic summarization. Such summary images are often called "image thumbnails" because in comparison to the larger image, the summary image could be as small as the nail material on the end of a human's thumb. While possibly hyperbolic, this gives a sense of the scaling down and condensing of information involved in summarization.

Summaries also exist in cartography. Making a more general map of a place on Earth from information provided by a detailed map has been a central activity of cartographers for centuries. The act of creating a map at lower scale than an original more detailed map requires careful judgment about which features to remove and which to include. Typically, this is called "cartographic generalization" in the sense that the detailed specific features of a high-scale map must be made more general and less specific for display at a lower scale. Frequently, large-format, high-scale maps are presented with a small-format, low-scale summary map or "overview" map showing the position of the large-format, high-scale map within a larger geographic area that maybe more easily recognized by viewers than the smaller physical area described by the large-format, higher scale map. These overview maps are usually much smaller format than the main map for which they provide an overview. These maps offer both a summary and more information by showing surrounding areas of the world. Such overview maps are an example of a summary that is the same general type of media object as the media object that it summarizes.

Geographic maps have been used in conjunction with other media objects for hundreds of years. For example, a map showing the positions of events or other geographic features can be presented along with text describing the events or locations. Historians or journalists describing a time period or set of issues in a place often make such narrative maps by annotating a map information, such as text and images, relating to locations within the map.

With the advent of computers, digital media objects have taken on many new forms.

SUMMARY OF THE INVENTION

The present invention provides a new type of summary that presents a user with new information about a digital media object, in a medium that can differ from that of the media object that it summarizes. We call this new type of summary a "spatial thumbnail." It is a "thumbnail" in the sense that it gives either a literal or mental image that is like an "image thumbnail" of a larger image. It is "spatial" in the sense that it depicts location-related content or spatial relationships conveyed in or related to the media object that it summarizes.

One example of a spatial thumbnail is a literal image of a map with visual indicators showing the positions of locations referenced in a document along with a piece of text excerpted from the document. For specificity, we call this a "spatial thumbnail image for a text document" because they have a literal image and are associated with a text document. The detailed description describes systems and methods for generating and using these specific types of spatial thumbnails and also several other types of spatial thumbnails. In general, a spatial thumbnail can be thought of as a media object that summarizes another media object's location-related content.

Under one aspect, a computer-implemented method of displaying information about a media object, the media object being associated with location-related content corresponding to a location, includes receiving a request to display a representation of the media object; in response to the request, obtaining a summary of the media object; in response to the request, obtaining a spatial thumbnail of the media object, the spatial thumbnail including an image of a spatial domain encompassing the location; and simultaneously displaying both the summary of the media object and the spatial thumbnail on a visual display.

One or more embodiments include one or more of the following features. The spatial thumbnail further includes a visual indicator indicating the location within the image of the domain. The visual indicator represents a subset of the location-related content. The visual indicator includes a marker icon or arrow. Selecting a type of visual indicator based on a type of location reference expressed in the location-related content. The image includes at least one of a two-dimensional image, a three-dimensional image, an animated image, a computer-generated hologram, and a sculpture. The spatial domain includes one of a geographic domain, a physical and non-geographic domain, and a fictional domain. Displaying the summary of the media object includes displaying at least one of a fragment of the media object and an image of the media object. Obtaining the spatial thumbnail of the media object includes one of obtaining the spatial thumbnail from a repository and generating the spatial thumbnail, wherein generating the spatial thumbnail includes obtaining the location-related content of the media object and obtaining the image of the spatial domain encompassing the location. Receiving the request to display the representation of the media object includes receiving user input referencing the media object. The location-related content represents at least one of a geographical reference and a spatial relationship within the media object. The location-related content is generated by an automated geoparsing engine. The location-related content expresses a subset of geospatial references within the media object, the subset of geospatial references being selected by the automated geoparsing engine. The media object includes one of a digital document, living organism, paper document, text document, rock, video, email message, web page, slide show presentation, spread sheet, equation rendering, music, or book. The summary of the book includes at least one of a sub-media object excerpted from the book, a review of the book, an image of a page of the book, and an image from the book. The spatial thumbnail includes a marker representing a spatial reference within the at least one sub-media object excerpted from the book. Also displaying a reference to the media object. The reference includes at least one of a hyperlink to the media object and a bibliographic reference to the media object. Also obtaining and displaying a plurality of spatial thumbnails for the media object, at least one spatial thumbnail representing different location-related content than at least one other spatial thumbnail. Also automatically generating the location-related content associated with the media object by performing the steps of identifying a spatial reference within the media object; associating a location with the identified spatial reference, the location being represented by a set of coordinates of a selected coordinate system; and encoding the set of coordinates in the location-related content.

Under another aspect, an interface program stored on a computer-readable medium for causing a computer system with a display device to display information about a media object, the media object being associated with location-related content corresponding to a location, causes the computer system to perform the functions of receiving a request to display a representation of the media object; in response to the request, obtaining a summary of the media object; in response to the request, obtaining a spatial thumbnail of the media object, the spatial thumbnail including an image of a spatial domain encompassing the location; and simultaneously displaying both the summary of the media object and the spatial thumbnail on a visual display.

Some embodiments include a parsing engine capable of generating the location-related content for the media object, the parsing engine including instructions for performing the following functions: identifying a spatial reference within the media object; associating a location with the identified spatial reference, the location being represented by a coordinate of a selected coordinate system; and encoding the coordinates in the location-related content.

Under another aspect, a computer-implemented method of displaying information about search results representing media objects, wherein at least one media object is associated with location-related content corresponding to a location, includes: receiving a query from the user; transmitting the query to a search engine; receiving search results from the search engine based on the query, each search result representing a media object; obtaining a spatial thumbnail for a search result representing a media object that is associated with location-related content corresponding to a location, the spatial thumbnail including an image of a spatial domain encompassing the location; and simultaneously displaying both the search results and the obtained spatial thumbnail on a visual display.

One or more embodiments include one or more of the following features. At least some of the search results represent digital media objects stored in a document repository. At least some of the search results represent digital media objects accessible via the World Wide Web. Also displaying a summary of the represented media object. Displaying the summary includes displaying at least one of a fragment of the represented media object and an image of the represented media object. The query from the user includes one of a free-text query, a free-text query with other query constraints, a selection from a list of options, and navigating through a sequence of links. The spatial thumbnail further includes a visual indicator indicating the location within the image of the domain. The visual indicator represents a subset of the location-related content. The visual indicator includes a marker icon or arrow. Selecting a type of visual indicator based on a type of location reference expressed in the location-related content. The represented media object includes one of a digital document, living organism, paper document, text document, rock, video, email message, web page, slide show presentation, spread sheet, equation rendering, music, or book. The spatial domain includes one of a geographic domain, a physical and non-geographic domain, and a fictional domain. The spatial domain encompasses location-related content from multiple media objects represented by the search results. The image includes at least one of a two-dimensional image, a three-dimensional image, an animated image, a computer-generated hologram, and a sculpture. Obtaining the spatial thumbnail of the represented media object includes one of obtaining the spatial thumbnail from a repository and generating the spatial thumbnail, wherein generating the spatial thumbnail includes obtaining the location-related content of the represented media object and obtaining the image of the spatial domain encompassing the location. The location-related content includes at least one of a geographical reference and a spatial relationship within the represented media object. The location-related content is generated by an automated geoparsing engine. The location-related content expresses a subset of geospatial references within the represented media object, the subset of geospatial references being selected by the automated geoparsing engine. The search results include at least one of a hyperlink and a bibliographic reference to the represented media object. Also automatically generating the location-related content associated with the represented media object by performing the steps of: identifying a spatial reference within the represented media object; associating a location with the identified spatial reference, the location being represented by a set of coordinates of a selected coordinate system; and encoding the set of coordinates in the location-related content.

Under another aspect, an interface program stored on a computer-readable medium for causing a computer system with a display device to display information about search results representing media objects, wherein at least some of the media objects are associated with location-related content corresponding to locations, causes the computer system to perform the functions of: receiving a query from the user; transmitting the query to a search engine; receiving search results from the search engine based on the query, each search result representing a media object; obtaining a spatial thumbnail for a search result representing a media object that is associated with location-related content corresponding to a location, the spatial thumbnail including an image of a spatial domain encompassing the location; and simultaneously displaying both the search results and the obtained spatial thumbnails on a visual display.

Definitions

For clarity, we define several terms of art:

A "media object" is any physical or electronic object that can be interpreted as containing information, thoughts, or emotions. Thus, a media object is a broad class of things, including such diverse objects as digital documents, living organisms, paper documents, text documents, rocks, videos, email messages, web pages, slide show presentations, spreadsheets, renderings of equations, and music.

A "digital media object" is a media object constructed from binary electronic signals or similar computing-machine oriented signals. Frequently, media objects can be stored in digital form, and this digital form can be replicated and transmitted to different computer systems many separate times.

A "document" is a media object containing information composed by humans for the purpose of transmission or archiving for other humans.

A "digital document" is a document that is a digital media object, such as a file stored in a file system or web server or digital document repository.

A "text document" is a document containing character symbols that humans can interpret as signifying meaning. A "digital text document" is a text document that is also a digital document. Typically, digital text documents contain character symbols in standardized character sets that many computer systems can interpret and render visually to users. Digital text documents may also contain other pieces of information besides text, such as images, graphs, numbers, binary data, and other signals. Some digital documents contain images of text, and a digital representation of the text may be separated from the digital document containing the images of text.

A "summary" is a media object that contains information about some other media object. By definition, a summary does not contain all of the information of the other media object, and it can contain additional information that is not obviously present in the other media object.

An "integrated summary" is a set of summaries about the same media object. For example, a web site about a book typically has several summaries organized in different ways and in different mediums, although they are all about the same book. An integrated summary can include both sub-media objects excerpted from the media object summarized by the integrated summary, and also summary media objects.

To "summarize" is to provide information in the form of a media object that is a selection of less than all of the information in a second media object possibly with the addition of information not contained in the second media object. A summary may simply be one or more excerpts of a subset of the media object itself. For example, a text search engine often generates textual summaries by combining a set of excerpted text from a document. A summary may be one or more sub-strings of a text document connected together into a human-readable string with ellipses and visual highlighting added to assist users reading the summary. For example, a query for "cars" might cause the search engine to provide a search result listing containing a list item with the textual summary " . . . highway accidents often involve <b>cars<b> that . . . dangerous pileups involving more than 20 <b>cars<b> . . . " In this example, the original media object contained the strings "highway accidents often involve cars that" and "dangerous pileups involving more than 20 cars", and the summary creation process added the strings " . . . " and "<b>" and "</b>" to make it easier for users to read the concatenated strings. These substrings from a document and represented to a user are an example of a "fragment" of a media object.

A "sub-media object" is a media object that is part of a second media object. For example, a chapter in a book is a sub-media object of the book, and a paragraph in that chapter is a sub-media object of the chapter. A pixel in a digital image is a sub-media object of the digital image. A sub-media object is any fragment of a larger media object. For example, a fragment of a document might be an image of a portion of the document, such is commonly done with digital scans of paper documents. A fragment of a text document might be a string of symbols contained in the text document and represented to a user. Since digital media objects can be replicated ad infinitum, a sub-media object of a digital media object can accurately reproduce any portion of the original media object without necessarily becoming a sub-summary.

A "sub-summary" is summary of a sub-media object. A summary may simply be a set of one or more sub-media objects excerpted from the original media object. The word "sub-summary" is defined here for clarity: a summary of a sub-media object is just as much a summary as other types of summaries, however in relation to a "containing summary" about a larger fragment of the original work, a sub-summary describes a smaller part than the containing summary that summarizes the larger fragment.

A "metric space" is a mathematical conceptual entity defined as follows: a metric space is a set of elements possibly infinite in number and a function that maps any two elements to the real numbers with the following properties. A metric on a set X is a function (called the distance function or simply distance)

d:X X X→R (where R is the set of real numbers). For all x, y, z in X, this function is required to satisfy the following conditions:
1. $d(x, y) \geq 0$ (non-negativity)
2. $d(x, y) = 0$ if and only if $x = y$ (identity of indiscernibles)
3. $d(x, y) = d(y, x)$ (symmetry)
4. $d(x, z) \leq d(x, y) + d(y, z)$ (subadditivity/triangle inequality).

A "vector space" is a mathematical conceptual entity with the following properties: Let F be a field (such as the real numbers or complex numbers), whose elements will be called scalars. A vector space over the field F is a set V together with two binary operations:

vector addition: $V \times V \to V$ denoted $v+w$, where $v, w \in V$, and scalar multiplication: $F \times V \to V$ denoted a v, where $a \in F$ and $v \in V$, satisfying the axioms below. Four require vector addition to be an Abelian group, and two are distributive laws.
1. Vector addition is associative: For all u, v, $w \in V$, we have $u+(v+w)=(u+v)+w$.
2. Vector addition is commutative: For all v, $w \in V$, we have $v+w=w+v$.
3. Vector addition has an identity element: There exists an element $0 \in V$, called the zero vector, such that $v+0=v$ for all $v \in V$.
4. Vector addition has an inverse element: For all $v \in V$, there exists an element $w \in V$, called the additive inverse of v, such that $v+w=0$.
5. Distributivity holds for scalar multiplication over vector addition: For all $a \in F$ and v, $w \in V$, we have $a (v+w) = a v + a w$.
6. Distributivity holds for scalar multiplication over field addition: For all a, $b \in F$ and $v \in V$, we have $(a+b) v = a v + b v$.
7. Scalar multiplication is compatible with multiplication in the field of scalars: For all a, $b \in F$ and $v \in V$, we have $a (b v) = (ab) v$.
8. Scalar multiplication has an identity element: For all $v \in V$, we have $1 v = v$, where 1 denotes the multiplicative identity in F.

Formally, these are the axioms for a module, so a vector space may be concisely described as a module over a field.

A "metric vector space" is a mathematical conceptual entity with the properties of both a vector space and a metric space.

The "dimension" of a vector space is the number of vectors in the equivalence class of basis vectors that minimally span the vector space.

A "line segment" is a geometric entity in a metric space defined by two entities in the metric space. These two entities are referred to as the "ends" of the line segment. The line segment is the two ends plus the concept of a shortest path connecting them, where the path length is determined by the metric on the metric space.

A "domain" is an arbitrary subset of a metric space. Examples of domains include a line segment in a metric space, a polygon in a metric vector space, and a non-connected set of points and polygons in a metric vector space.

A "sub-domain" is a domain which is a subset of another domain. For example, if one is considering a domain that is a polygon, then an example of a sub-domain of that domain is a line segment or subset of line segments selected from the set of line segments that make up the polygon.

A "polyline" is an ordered set of entities in a metric space. Each adjacent pair of entities in the list is said to be "connected" by a line segment.

A "polygon" is a polyline with the additional property that it implicitly includes a line segment between the last element in the list and first element in the list.

A "polyhedron" is a set of polygons with some of the line segments inherent in the underlying polylines are associated with line segments from other polygons in the set. A "closed" polyhedron is a polyhedron in a metric vector space and every line segment is associated with a sufficient number of other line segments in the set that one can identify an interior domain and an exterior domain such that any line segment connecting an element of the interior domain to an element of the exterior domain is guaranteed to intersect a polygon in the set.

A "spatial domain" is a domain in a metric vector space.

A "coordinate system" is any means of referring to locations within a spatial domain. For example, a so-called Cartesian coordinate system on a real-valued metric vector space is a tuple of real numbers measuring distances along a chosen set of basis vectors that span the space. Many examples of coordinate systems exist. "Unprojected latitude-longitude" coordinates on a planet, like Earth, are an example of two-dimensional spherical coordinates on a sphere embedded in three-dimensional space. A "datum" is a set of reference points from which distances are measured in a specified coordinate system. For example, the World Grid System 1984 (WGS84) is commonly used because the Global Position System (GPS) uses WGS84 as the defining datum for the coordinates that it provides. For coordinate systems used to describe geographic domains, one often speaks of "projected" coordinate systems, which are coordinates that can be related to unprojected latitude-longitude via mathematical functions and procedures called "projection functions." Other types of coordinate systems use grids to divide a particular domain into subdomains, e.g. the Military Grid Reference System (MGRS) divides the Earth into subdomains labeled with letters and numbers. Natural language references to places are a coordinate system in the general sense that people often recognize a phrase like "Cambridge" as meaning a place, but there may be many such places. Such ambiguity is typically not tolerated in the design of coordinate systems, so an important part of constructing location-related content is coping with such ambiguity, either by removing it or describing it or simply stating that it exists.

A "physical domain" is a spatial domain that has a one-to-one and onto association with locations in the physical world in which people could exist. For example, a physical domain could be a subset of points within a vector space that describes the positions of objects in a building. An example of a spatial domain that is not a physical domain is a subset of points within a vector space that describes the positions of genes along a strand of DNA that is frequently observed in a particular species. Such an abstract spatial domain can be described by a map image using a distance metric that counts the DNA base pairs between the genes. An abstract space, humans could not exist in this space, so it is not a physical domain.

A "geographic domain" is a physical domain associated with the planet Earth. For example, a map image of the London subway system depicts a geographic domain, and a CAD diagram of wall outlets in a building on Earth is a geographic domain. Traditional geographic map images, such as those drawn by Magellan depict geographic domains.

A "location" is a spatial domain. Spatial domains can contain other spatial domains. A spatial domain that contains a second spatial domain can be said to encompass the second spatial domain. Since some spatial domains are large or not precisely defined, any degree of overlap between the encompassing spatial domain and the encompassed location is considered "encompassing." Since a spatial domain is a set of elements from a metric vector space, the word "encompassing" means that the logical intersection of the sets of elements represented by the two spatial domains in question is itself a non-empty set of elements. Often, "encompassing" means that all of the elements in the second spatial domain are also elements in the encompassing domain. For example, a polygon describing the city of Cambridge is a location in the spatial domain typically used to represent the state of Massachusetts. Similarly, a three-dimensional polyhedron describing a building in Cambridge is a location in the spatial domain defined by the polygon of Cambridge. The word "location" is a common parlance synonym for a "spatial domain."

A "location reference" is a sub-media object of a document that a human can interpret as referring to a location. For example, a sub-string of a document may be "Cambridge, Mass.," which a human can interpret as referring to an entity with representative coordinates longitude-latitude coordinates (−71.1061, 42.375).

A "geospatial reference" is a location reference to a location within a geographic domain.

"Location-related content" is information that can be interpreted as identifying or referring to a location within a spatial domain. Location-related content can be associated with a media object in many ways. For example, location-related content may be contained inside the media object itself as location references, such as names of places, explicit latitude-longitude coordinates, identification numbers of objects or facilities or buildings. For another example, location-related content may be associated with a media object by a system that associates a reference to a media object with location-related content that is separate from the media object itself. Such a system might be a database containing a table with a URL field and a latitude-longitude field in a table. To obtain location-related content associated with a media object, a person or computer program might pass the media object to a geoparsing engine to extract location-related content contained inside the media object, or it might utilize a system that maintains associations between references to media objects and location-related content. The fact that a creator of a media object once lived in a particular place is a piece of location-related content associated with the media object. Other examples of such auxiliary location-related content are the locations of physical copies of the media object and locations of people interested in the media object.

A "sub-media object that is not a location-related content" is a sub-media object that is not a location reference. For example, a fragment of a text document that says "Eat great pizza in" is not location-related content even though the subsequent string may be a location reference.

A "spatial relationship" is information that can be interpreted as identifying or referring to a geometric arrangement, ordering, or other pattern associated with a set of locations. For example, "the aliens traveled from Qidmore Downs to Estheral Hill," describes a spatial relationship that organizes the location references "Qidmore Downs" and "Estheral Hill" into an ordering.

A "reference to a media object" is a means of identifying a media object without necessarily providing the media object itself. For example, a URL is a reference to a media object. For another example, media object title, author, and other bibliographic information that permits unique identification of the media object is a reference to that media object.

An "image" is a media object composed of a two-dimensional or three-dimensional array of pixels that a human can visually observe. An image is a multi-dimensional representation of information. The information could come from a great variety of sources and may describe a wide range of phenomena. Pixels may be black/white, various shades of gay, or colored. Often a three-dimensional pixel is called a "voxel." An image may be animated, which effectively introduces a fourth dimension. An animated image can be presented to a human as a sequence of two- or three-dimensional images. A three-dimensional image can be presented to a human using a variety of techniques, such as a projection from three-dimensions into two-dimensions or a hologram or a physical sculpture. Typically, computers present two-dimensional images on computer monitors, however, some human-computer interfaces present three-dimensional images. Since an image is a multi-dimensional representation of information, it implies the existence of a metric on the information. Even if the original information appears to not have a metric, by representing the information in an image, the process of creating the image gives the information a metric. The metric can be deduced by counting the number of pixels separating any two pixels in the image. If the image is animated, then the distance between pixels in two separate time slices includes a component from the duration of time that elapses between showing the two time slices to the human. Typically, a Euclidean metric is used to measure the distance between pixels in an image, however other metrics may be used. Since images can be interpreted as having a metric for measuring the distance between pixels, they are representations of domains. Typically, images are representations of spatial domains. An image of a spatial domain that is associated with the planet Earth is typically called a "geographic map." An image of another spatial domain may also be called a "map," but it is a map of a different type of space. For example, an image showing the fictional location known as "Middle Earth" described in the novels by Tolkien is a type of map, however the locations and domains displayed in such a map are not locations on planet Earth. Similarly, one may view images showing locations on the planet Mars, or locations in stores in the city of Paris, or locations of network hubs in the metric space defined by the distances between router connections on the Internet, or locations of organs in the anatomy of the fish known as a Large-Mouth Bass. An image depicting a spatial domain allows a person to observe the spatial relationships between locations, such as which locations are contained within others and which are adjacent to each other. A subset of pixels inside of an image is also an image. Call such a subset of pixels a "sub-image". In addition to simply depicting the relationships between locations, an image may also show conceptual relationships between entities in the metric space and other entities that are not part of that metric space. For example, an image might indicate which people own which buildings by showing the locations of buildings arranged in their relative positions within a domain of a geographic metric space and also showing sub-images that depict faces of people who own those buildings. Other sub-images may be textual labels or iconography that evokes recognition in the human viewer.

A "map image" is an image in which one or more sub-images depict locations from a spatial domain. A "geographic map image" is a map image in which the spatial domain is a geographic space.

A "search engine" is a computer program that accepts a request from a human or from another computer program and responding with a list of references to media objects that the search engine deems relevant to the request. Another name for a request to search engine is "search query" or simply a "query." Common examples of search engines include:

free-text search engines that display lists of text fragments from media objects known as "web pages;"

image search engines that accept free-text or other types of queries from users and present sets of summaries of images, also known as "image thumbnails;"

commerce sites that allow users to navigate amongst a selection of product categories and attributes to retrieve listings of products; and online book stores that allow users to input search criteria in order to find books that match their interests. Frequently, a result set from a book search engine will contain just one result with several different types of summaries about the one book presented in the result list of length one. Related books are often described on pages that are accessible via a hyperlink; clicking such a hyperlink constructs a new query to the book search engine, which responds by generating a new page describing the new set of results requested by the user.

A "search result listing" is the list of references provided by a search engine.

A "text search engine" is a search engine that accepts character symbols as input and responds with a search result listing of references to text documents.

A "human-computer interface device" is a hardware device that allows a person to experience digital media objects using their biological senses.

A "visual display" is a media object presented on a human-computer interface device that allows a person to see shapes and symbols arranged by the computer. A visual display is an image presented by a computer.

Computer systems often handle "requests" from users. There are many ways that a computer system can "receive a request" from a user. A mouse action or keystroke may constitute a request sent to the computer system. An automatic process may trigger a request to a computer system. When a user loads a page in a web browser, it causes the browser to send a request to one or more web servers, which receive the request and respond by sending content to the browser.

A "visual indicator" is a sub-image inside of a visual display that evokes recognition of a location or spatial relationship represented by the visual display.

A "marker symbol" is a visual indicator comprised of a sub-image positioned on top of the location that it indicates within the spatial domain represented by the visual display.

An "arrow" is a visual indicator comprised of an image that looks like a line segment with one end of the line segment closer to the location indicated by the visual indicator and the other end farther away, where closer and farther away are determined by a metric that describes the visual display.

The word "approximate" is often used to describe properties of a visual display. Since a visual display typically cannot depict every single detailed fact or attribute of entities in a space, it typically leaves out information. This neglect of information leads to the usage of the term approximate and often impacts the visual appearance of information in a visual display. For example, a visual indicator that indicates the location "Cambridge, Mass." in a geographic map image of the United States might simply be a marker symbol positioned on top of some of the pixels that partially cover the location defined by the polygon that defines the boundaries between Cambridge and neighboring towns. The marker symbol might overlap other pixels that are not contained within Cambridge. While this might seem like an error, it is part of the approximate nature of depicting spatial domains.

A "spatial thumbnail" is a visual display of a summary of a media object that presents to a user location-related content or spatial relationships contained in the media object summarized by the spatial thumbnail.

A "digital spatial thumbnail" is a spatial thumbnail comprised of a digital media object that summarizes a second media object, which might be either digital media object or other form of media object.

A "companion map" is a visual display that includes one or more spatial thumbnails and the entire media object summarized by the spatial thumbnail. If a companion map is a sub-summary, then may include only the sub-media object and not the entirety of the larger media object from which the sub-media object is excerpted.

An "article mapper application" is a computer program that provides companion maps for a digital media object.

To "resolve" a location reference is to associate a sub-media object with an entity in a metric space, such as a point in a vector space. For example, to say that the string "Cambridge, Mass." means a place with coordinates (−71.1061, 42.375) is to resolve the meaning of that string.

A "geoparsing engine" is a computer program that accepts digital media objects as input and responds with location-related content extracted from the media object and resolved to entities in a metric space. While the name "geoparsing engine" includes the substring "geo", in principle a geoparsing engine might extract location-related content about locations in non-geographic spatial domains, such as locations within the anatomy of an animal or locations with a metric space describing DNA interactions or protein interactions. Such a system might simply be called a "parsing engine."

A "text geoparsing engine" is a geoparsing engine that accepts digital text documents as input and responds with location-related content extracted from the document and resolved to entities in a metric space.

An "automatic spatial thumbnail" is a spatial thumbnail generated by a geoparsing engine without a human manually extracting and resolving all of the location references of the media object summarized by the spatial thumbnail. An automatic spatial thumbnail might be semi-automatic in the sense that a human might edit portions of the spatial thumbnail after the geoparsing engine generates an initial version. The geoparsing engine may operate by generating so-called "geotags," which are one type of location-related content that uses SGML, XML, or another type of compute-readable format to describe locations and spatial relationships in a spatial domain, such as a geographic domain. For further details on geotags, see, e.g., U.S. Provisional Patent Application No. 60/835,690, filed Aug. 4, 2006 and entitled "Geographic Text Search Enhancements," the entire contents of which are incorporated herein by reference.

An "automatic spatial thumbnail of a text document" is an automatic spatial thumbnail generated by a text geoparsing engine in response to a digital text document.

An "integrated spatial thumbnail" is an integrated summary that includes as one or more spatial thumbnails. An integrated spatial thumbnail may include sub-media objects excerpted from the media object being summarized, which illustrate location references that relate to the location-related content summarized by the spatial thumbnail. For example, an integrated spatial thumbnail that summarizes a PDF file might show text excerpted from the PDF file and a spatial thumbnail with a geographic map image showing visual indicators on locations described in the PDF's text. For another example, an integrated spatial thumbnail that summarizes a movie might show a text transcript of words spoken by actors in the movie and a spatial thumbnail showing the animated path of two of the movie's protagonists through a labyrinth described in the film.

An "automatic integrated spatial thumbnail" is an integrated spatial thumbnail in which one or more of the spatial thumbnails is an automatic spatial thumbnail.

A "representation of location-related content" is a visual display of associated location-related content. Since location-related content describes domains and spatial relationships in a metric space, a representation of that content uses the metric on the metric space to position visual indicators in the visual display, such that a human viewing the visual display can understand the relative positions, distances, and spatial relationships described by the location-related content.

A "web site" is a media object that presents visual displays to people by sending signals over a network like the Internet. Typically, a web site allows users to navigate between various visual displays presented by the web site. To facilitate this process of navigating, web sites provide a variety of "navigation guides" or listings of linkages between pages.

A "web site front page" is a type of navigation guide presented by a web site.

DESCRIPTION OF DRAWINGS

FIG. 7 schematically depicts a graphical user interface for displaying information about media objects referenced in search results.

DETAILED DESCRIPTION

Overview

Figure 1:
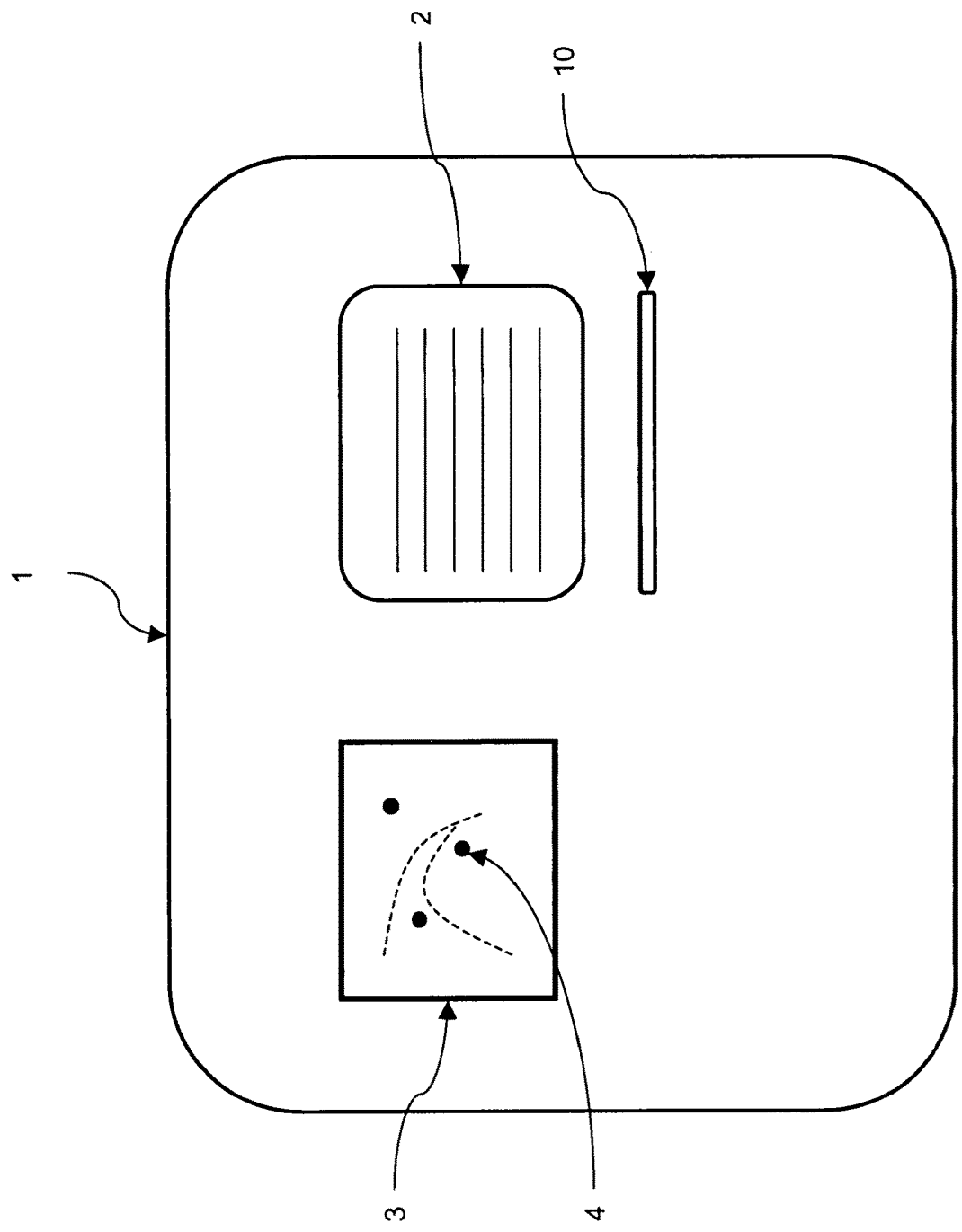
FIG. 1 schematically represents a graphical user interface for displaying a spatial thumbnail and a document summary to a user.

A "spatial thumbnail" is a visual summary of location-related content in a media object, such as a document or video. A spatial thumbnail is an image or other form of media containing indicators of places and spatial relationships that connote, indicate, or otherwise prompt recognition of location-related content associated with a media object. The location-related content may be explicitly referenced in the media, such as specific place names or spatial coordinates, or it may be implied by association, such as organizational associations of the authors or protagonists in the associated media object, historical events depicted in the associated media object, genre of the associated media object or other attributes that connote location-related content or spatial relationships. The spatial thumbnail may summarize this location-related content explicitly on a map image using cartographic symbology or it may depict an approximate spatial sketch of the location-related content. Alternatively, a spatial thumbnail may present audio or video to illuminate the location-related content of a media object. A spatial thumbnail may be integrated with other summarizing elements to form an integrated summary. A companion map is similar to a spatial thumbnail except that it accompanies the full content of the media object to which it is associated.

Spatial Thumbnails for Document Summaries

Documents are an important type of media object. Digital documents occur frequently in modern life, both in work and non-work environments. Spatial thumbnails of documents enable several useful thought patterns and work flows that would be difficult without spatial thumbnails. For example, web sites owned by newspaper companies typically organize their front page visual display to help their visitors assess which news stories are more interesting or important than others. Given limited display space and limited attention span of users, such web sites typically present very short summaries of the news stories. The success of the news site in serving its content to content consumers and the success of the consumers in finding content they desire is largely determined by the quality of the summaries presented. By including a spatial thumbnail as a component in such an integrated summary, a web site can give its users a different perspective on the content without forcing the user to spend time loading or viewing the associated media object in its entirety.

For example, consider two news stories about fishing licenses in the Bay of Fundy. One may refer to locations along the shore of Maine and the other to Nova Scotia and Grand Mannan Island. While a news paper web site may contain both articles, the space allotted to describing the two articles might only permit twenty words per article, which is not enough to describe the content of the story and the list of places referenced. However, displaying, for example, a fifteen word extract of the document instead of twenty words, and using the extra space to show a small spatial thumbnail a geographic map image of the area with markers on the locations referenced in one or the other article can communicate this location-related information without consuming additional space on the front page.

As another example, consider a document describing the detailed behavior of birds in some parts of South America. Such a document might be stored in an online archive that charges for access to its documents, and thus only presents summary information to prospective customers. Without a spatial thumbnail, these would-be customers would not know whether the document discusses specific sub-regions of the large region of South America that matter to their particular interests. A spatial thumbnail could simply be a listing of salient place names from the document, or it could be a spatial thumbnail image showing such salient locations.

FIG. 1 schematically illustrates a graphical user interface (GUI) (1) for a "thumbnail" software system that allows users to visualize spatial information, in the form of spatial thumbnails, within media objects such as digital documents. The GUI includes two "areas" for displaying information about a media object to a user: a spatial thumbnail (3) representing spatial information within the media object, and a summary (2) of the media object. The spatial thumbnail (3) graphically displays an image representing location-related content and/or spatial relationships described in the media object. More specifically, the spatial thumbnail (3) includes an image of a spatial domain, e.g., a geographical map, and one or more markers (4) on the image that represent locations or spatial relationships described or referenced by the media object, such as points representing cities, or polylines representing routes from location to another. The summary (3) is a succinct representation of the media object, or of a sub-media object within the media object, for example an excerpt from the media object, a review of the media object, or an image of the media object or a portion of the media object. Together, the spatial thumbnail (3) and summary (2) allow users to quickly assess whether the media object is of interest to them, e.g., whether the media object references geographical locations, and subject matter, of interest. Optionally, the GUI also includes a reference (10) to the media object, such as a hyperlink or bibliographic citation information, which the user can use to access the full media object.

Figure 2:
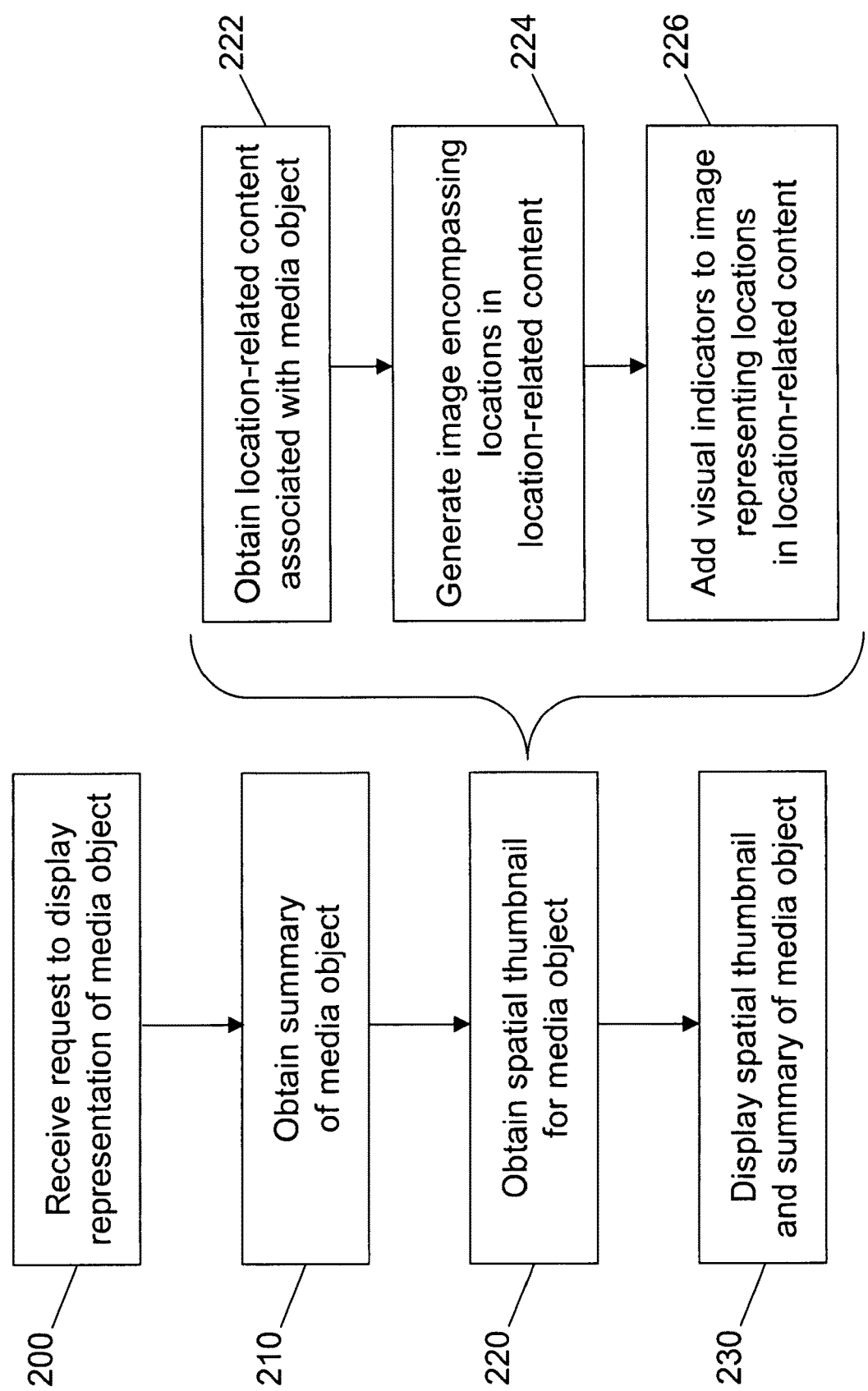
FIG. 2 is a high level flow diagram of a computer-implemented method of displaying information about a media object.

FIG. 2 is a high-level flow diagram of steps the thumbnail software system takes to display information about a given media object. First, the thumbnail software system receives a request to display information about the media object (200). For example, the user may click on a hyperlink referencing a book he is considering purchasing, which invokes the thumbnail software system, causing it to display a summary and spatial thumbnail of the media object as described in greater detail below, and thus helping the user assess whether he wants to buy the book. Next, the thumbnail software system obtains the summary of the media object (210). Depending on the particular application and the type of media object, the thumbnail software system may be associated with algorithms that generate the summary of the media object when the user requests information about the media object; or, the summary may have been previously generated by a separate system, and simply stored in a summary repository from which the thumbnail software system obtains it.

Next, the thumbnail software system obtains the spatial thumbnail for the media object (220), based on location-related content describing location references or spatial relationships described by or relating to the media object. In some embodiments, the system does this by first obtaining location-related content associated with the media object (222), such as coordinates for a location referenced within the media object. If the media object refers to multiple locations, the location-related content can represent locations corresponding to some or all of these references. As discussed in greater detail below, the location-related content can be generated on the fly, e.g., by software systems associated with or incorporated into the thumbnail software system, or it can be obtained from a repository of previously generated location-related content for media objects.

The thumbnail software system then generates an image based on the location-related content (224). The image represents a spatial domain relevant to the location-related content, e.g. a colorful digital backdrop geographic map image showing a geographic domain encompassing location(s) described by the location-related content associated with the media object. For example, if the location-related content associated with the media object represents multiple locations in a selected sub-domain of Japan, appropriate backdrop maps include a geographic map image of the entire country of Japan, or a map of the selected sub-domains of Japan. The system generates the map by obtaining it from a map repository or other map image generating system, and optionally resizing or otherwise modifying the extent of the domain represented by the image so as to appropriately represent a relevant sub-domain containing some or all of the location references described by the location-related content associated with the media object. For example, the system could generate a geographic map image by obtaining information from a geographical database that the system then uses to render an appropriate image.

The thumbnail software system then optionally generates visual indicator(s) to represent the location(s) and spatial relationships described in the location-related content (226). The thumbnail software system selects the visual indicators based on the number and kind of locations and spatial relationships described in the location-related content. For example, if the location-related content describes multiple cities in a country, the system may indicate the locations of those cities using circular image symbols superimposed on a geographical map image at the approximate locations of those cities. For another example, if the location-related content represents a specific area of a given city, the system may display a polygon that approximates the shape of the city. For another example, if the location-related content represents a route taken along a river and up a road from one town to another, then the system may display a polyline in the image that it generates.

The thumbnail software system then simultaneously displays the spatial thumbnail, and the summary of the media object, to the user (230), e.g., as illustrated in FIG. 1.

In other embodiments, the thumbnail software system does not generate the spatial thumbnail, but obtains a previously generated spatial thumbnail from an appropriate repository, e.g., database. If the media objects are digital, and collectively stored in a repository, then the spatial thumbnails can be stored with the media objects in the repository and then obtained for display in the GUI, thus obviating the need to dynamically generate the spatial thumbnails each time the user wishes to view information about the media objects.

The location-related content associated with the media object, which the thumbnail software system uses to generate the spatial thumbnail for the media object, may be generated by a "geoparsing" software system that parses the media object (or information about the media object) and uses appropriate analytical tools to determine what location references and spatial relationships the media object contains or describes. Based on the locations and spatial relationships that the analysis identifies, the parsing software system then generates a location-related content that describes the appropriate information in terms of domains, sub-domains, and relationships between entities in a metric space. For example, if the media object references "Cambridge, Mass.," the parsing software system generates a location-related content representing the geographic coordinates (−71.10161, 42.375). Or, for example, if the media object describes that "the aliens traveled from Qidmore Downs to Estheral Hill," the parsing software system generates a location-related content representing not only the geographic coordinates of the two locations, but also information ordering the two locations, and optionally information regarding a route between the two locations. For some media objects, the location-related content includes both references to locations and also spatial relationships.

The parsing software system may associate the generated location-related content with the media object, e.g., by adding the location-related content to the media as "metadata," by storing the location-related content in a database along with the media object, or by indexing the location-related content with a reference to the media object. In other words, the parsing software system stores the location-related content, and thus a representation of location(s) referenced by or relating to the media object, in an indexed database that the thumbnail software system can later access in order to generate a spatial thumbnail for the media object. Thus, the location-related content need not be generated each time the thumbnail software system generates a spatial thumbnail for the media object. Alternately, the parsing software system can be directly associated with the thumbnail software system, in order to generate location-related content for media objects as users request information about the media objects. In other words, the parsing software system can be configured to generate location-related content in response to requests for information about media objects, and to pass the location-related content to the thumbnail software system for use in generating spatial thumbnails.

The GeoParser software described in U.S. Pat. No. 7,117,199, the entire contents of which are incorporated herein by reference, is one example of a parsing software system that automatically generates location-related content for digital media objects. There are a great variety of geoparsing engines. Some simply recognize latitude-longitude coordinate metadata stored inside of media objects, such as the headers and auxiliary files of GeoTIFF images. Others geoparsing engines recognize street addresses contained in specially designated fields in databases associated with documents. More advanced geoparsing engines use natural language processing to recognize when substrings of a document were intended by the author to refer to specific locations, such as "twenty miles north of al Hamra," where the phrase "al Hamra" could have meant the color read or it could have meant one of many small towns and villages in the Middle East, which the geoparsing engine must differentiate between in order to resolve the location reference to a specific location in a geographic domain.

Note that the media object itself need not be stored in a database accessible to the thumbnail software system, or even be stored in a digital format. The media objects simply need to have an associated location-related content that the thumbnail software system can use to generate a thumbnail, and a summary that the thumbnail software system can display to the user. The location-related content can be automatically generated using a geoparsing engine or other appropriate parsing software system, or can be manually generated and digitally associated with the document in a database that the thumbnail software system can access. Thus, the thumbnail software system can generate spatial thumbnails for a wide variety of media objects, such as digital documents, living organisms, paper documents, text documents, rocks, videos, email messages, web pages, slide show presentations, spreadsheets, rendering of equations, and music. If the media object is digital, e.g., digital text, digital images, graphs, numbers, binary data, or other signals, an appropriate parsing software system can be used to automatically generate location-related content for the object.

Spatial Thumbnails for Book Summary Pages

A book is a special type of document, because books are often large and thus include many sub-media objects, e.g., chapters, paragraphs, and images. The aggregate value of the large number of sub-media objects typically contained in a book makes books a particularly valuable type of document. Spatial thumbnails of books are particularly valuable types of spatial thumbnails both because books are often valuable and because they contain large amounts of information, which is often difficult to summarize in a small amount of space in a visual display.

To find information in books, traditional text search engine techniques are often insufficient, because the sheer quantity of information in a book is typically poorly summarized by the short summaries traditionally provided by text search result listings. To remedy this, book search engines often provide larger "integrated summaries" of a book's content. For example, an integrated summary for a book may show several textual excerpts from different chapters, an image of the cover of the book or of pages from the book, and text from reviewers describing the book. By containing many summaries, such an integrated summary may cover or represent most or even all of the information present in the book.

Such an integrated summary may contain sub-media objects excerpted from the book, reviews from people who read the book, images of pages from the book, images from the book, and other perspectives on the book.

Spatial thumbnails add useful information to integrated summaries for books and other relatively lengthy media objects, by allowing a user to quickly assess location references within the book. For example, a spatial thumbnail that summarizes a book like "Around the World in Eighty Days" allows would-be readers of the book to appreciate the full significance of traveling around the entire world, without needing to browse multiple sections or summaries of the book.

Similarly, guidebooks about Australia tend to cover different areas of the massive land with differing levels of depth. Even if two guidebooks with otherwise similar summaries, a traveler interested primarily in the area of New South Wales can differentiate between the two if a spatial thumbnail for one of the books shows a much greater density of locations in that area of interest.

Figure 3:
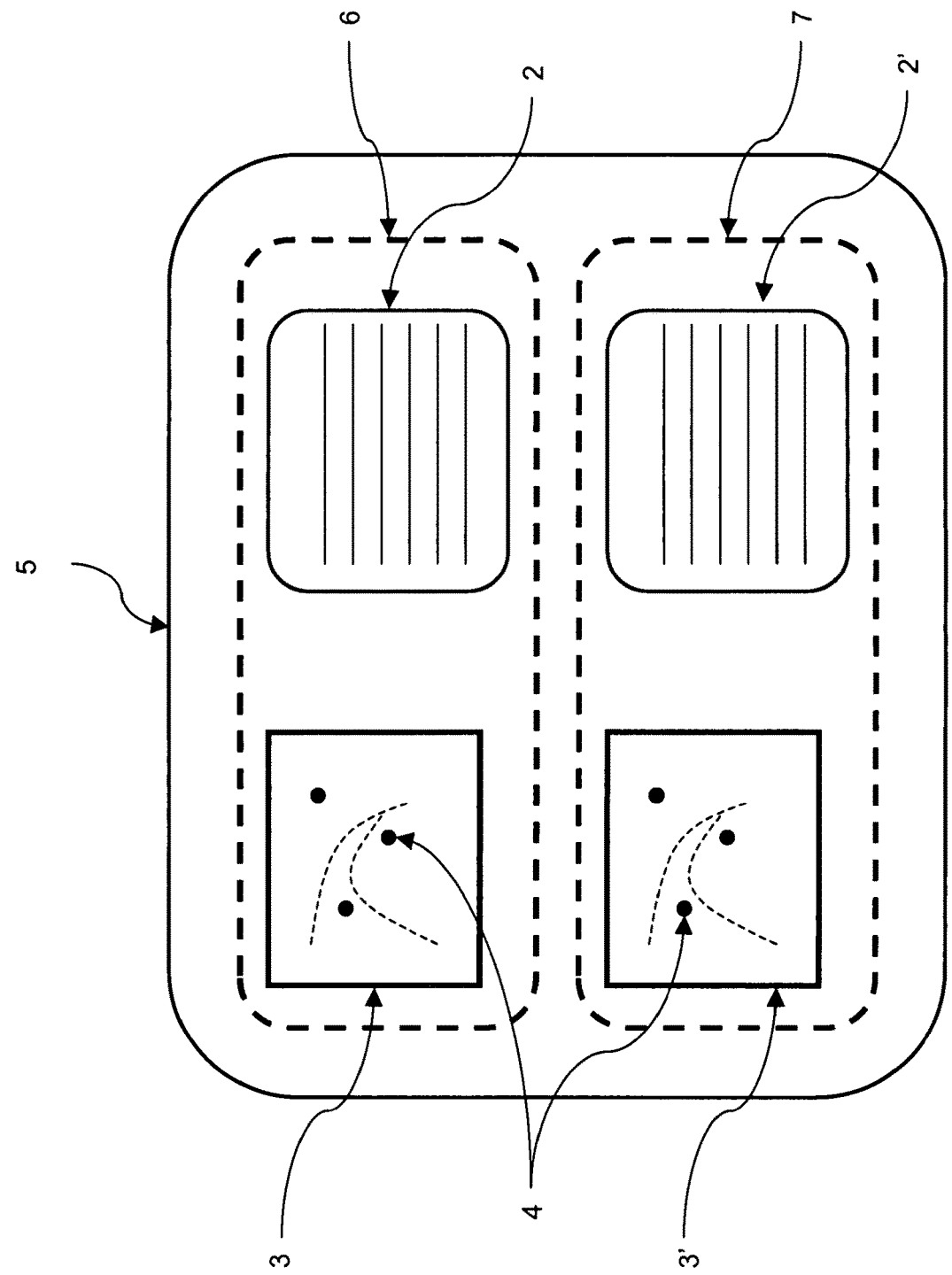
FIG. 3 schematically represents a graphical user interface for displaying an integrated summary to a user.

FIG. 3 schematically illustrates a GUI (5) for a thumbnail software system that allows users to visualize spatial information from a book via an integrated summary. The GUI includes a first summary area (6) including first spatial thumbnail (3) associated with a first sub-media object (2) from the book, e.g., a first fragment of text from the book;

and a second summary area (7) including a second spatial thumbnail (3') associated with a second sub-media object (2') from the book. The first and second sub-media objects are associated with first and second sets of location-related content. The thumbnail software system obtains the first and second spatial thumbnails (3) and (3'), which respectively represent spatial information associated with the first and second sub-media objects (2) and (2'), as described in greater detail above. Because the first and second sets of location-related content can represent different spatial references, the first and second spatial thumbnails can represent different locations, e.g., have different maps and/or different markers (4).

GUI (5) can also be used to show summaries and spatial thumbnails associated with two separate media objects, e.g., books, and thus allow users to simultaneously visualize spatial information related to different media objects. In this embodiment, the first summary area (6) includes a first spatial thumbnail (3) and a first summary or sub-media object (2), associated with a first media object; and the second summary area (7) includes a second spatial thumbnail (3') and a second summary or sub-media object (2'), associated with a first media object. The GUI can also include first and second references (not shown) to the first and second media objects, e.g., hyperlinks to the media objects, hyperlinks to more detailed summaries of the media objects, or bibliographic information about the media objects, thus allowing the user to learn more about the media object after viewing its summary.

Spatial Thumbnails for Search Results

Search engines accelerate learning, commerce, and other aspects of daily life. While the conventional generation of a list of references that allow people to retrieve media objects is important, a fundamental component of the usefulness of search engines is the summarizing nature of the search results themselves.

Spatial thumbnails can enhance the presentation of search results referencing media objects with significant location information. For example, when using a free text based search engine, a user could enter a query for "exotic fruit farms" and receive a listing of millions of web pages mentioning those words. With only conventional textual summaries, the user would be forced to guess which search results refer to places that they consider interesting. Including a spatial thumbnail in an integrated summary alongside the textual summary for each document referenced in a search result makes it possible for users to detect in a single glance whether a document contains location references of interest to them. This is superior to forcing the user to enter keywords associated with places of interest to them, because with the inclusion of spatial thumbnails the user can type a shorter, simpler query string and still understand the spatial significance of the returned results.

Figure 4:
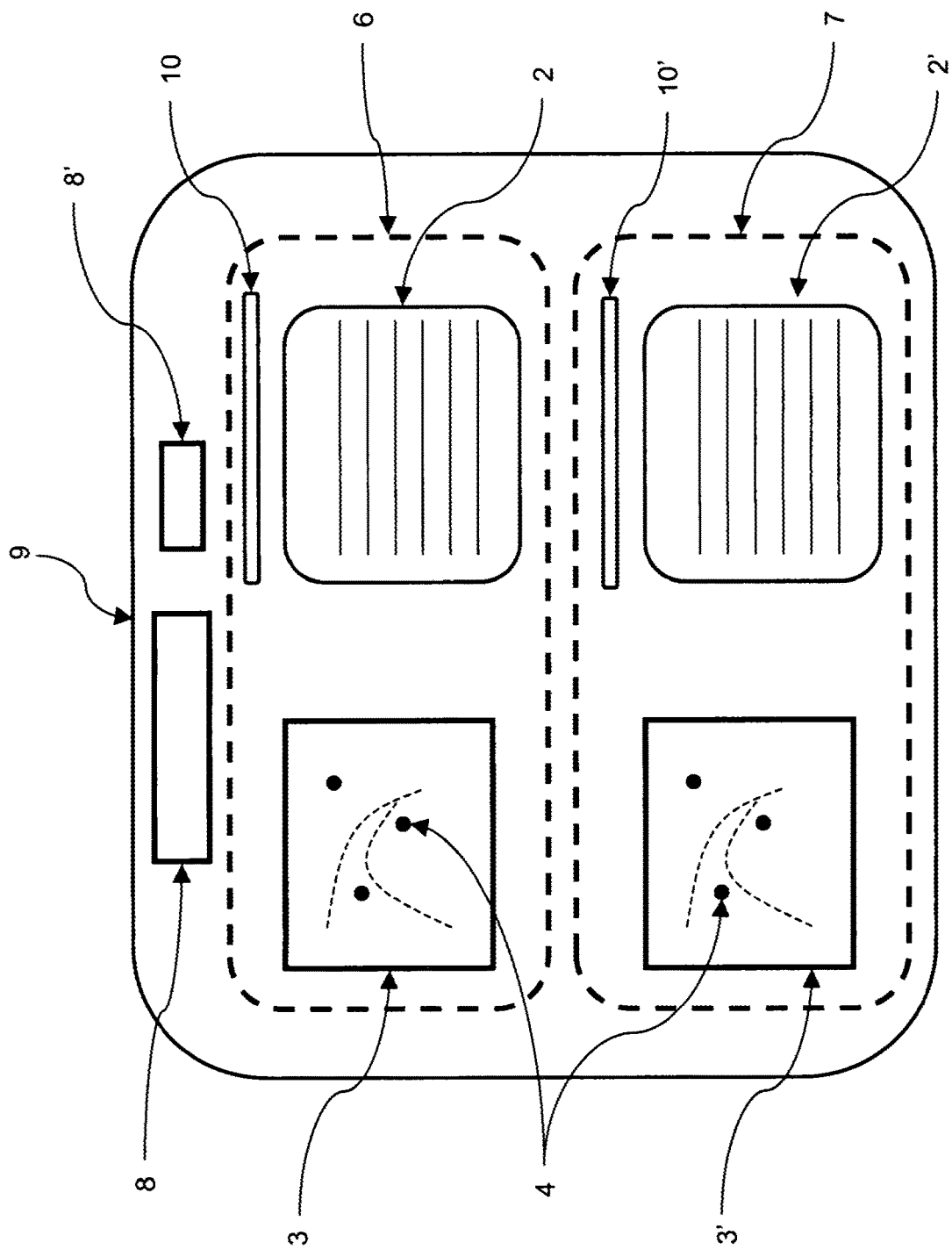
FIG. 4 schematically represents a graphical user interface for displaying spatial thumbnails for media objects referenced in search results.

FIG. 4 schematically illustrates a GUI (6) for a thumbnail software system associated with a search engine that allows users to visualize spatial information associated with search results. The GUI includes a text entry box (8) to accept free text queries from a user, and a "submit" button (8') that the user can click to pass a query to the search engine. Alternatively, the user can simply hit "ENTER" on his keyboard to pass a query to the search engine. The search engine returns the results to the thumbnail software system, which then obtains a spatial thumbnail for search results associated with media objects that reference spatial information. FIG. 4 illustrates the result of a free text query that generates two search results associated with media objects that each references spatial information, e.g., geographical locations, and thus has a spatial thumbnail. First result area (6) is associated with a first search result referencing a first media object, and second result area (7) is associated with a second search result referencing a second media object. First result area (6) includes a summary of a first media object (2), a reference to the first media object (10), and a first spatial thumbnail (3) representing a spatial reference within the first media object. Second result area (7) includes a summary of a second media object (2'), a reference to the second media object (10'), and a second spatial thumbnail (10') representing a spatial reference within the second media object. Displaying a spatial thumbnail associated with a conventional search result, e.g., a brief media object summary and reference to the media object, allows the user to more quickly assess the relevance of the link to the user's interest.

Figure 5:
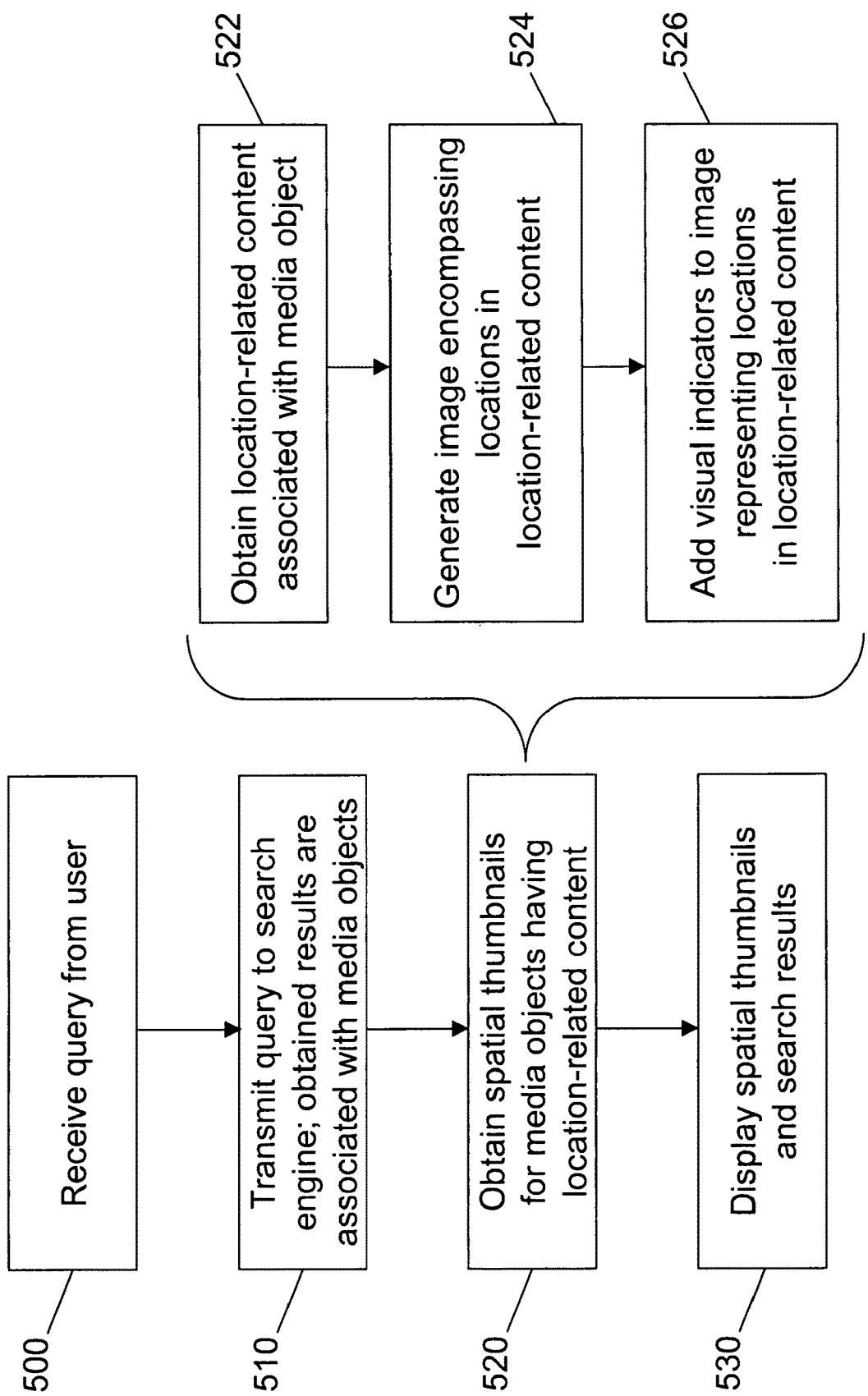
FIG. 5 is a high-level flow diagram of a computer-implemented method of displaying information about media objects referenced in search results.

FIG. 5 is a high-level flow diagram of steps that a thumbnail software system, associated with a search engine, uses to display search results and spatial thumbnails associated with the search results. First, the thumbnail software system receives a query from a user (500), e.g., via a free-text query box presented to the user. The thumbnail software system then transmits the query to a search engine, and obtains the results from the search engine (510). When the search engine receives the query from the thumbnail software system, it generates a list of search results that reference media objects, e.g., media objects that exist in a database with which the search engine is in communication, or on the World Wide Web. Digital documents and web pages are examples of searchable media objects. Each search result includes a reference to the media object, e.g., a hyperlink and/or bibliographic information that the user can use to directly access the media object, and optionally also includes a summary of the media object. For example, some search engines generate or otherwise obtain a summary for media objects referenced in search results.

After obtaining the search results from the search engine, the thumbnail software system obtains spatial thumbnails for search results referencing media objects that have spatial references (520), e.g. using the systems and methods described above. Briefly, the system first obtains location-related content associated with the media object (522). The location-related content represents one or more locations corresponding to one or more spatial references within the media object; if the media object does not have spatial references, it does not have associated location-related content. The thumbnail software system then generates an image of a spatial domain, e.g., a map, based on the location-related content (524), and optionally generates visual indicators representing the location-related content (526). In other embodiments, the system obtains a spatial thumbnail that was previously generated and associated with the media object, e.g., from a database, as discussed in greater detail above.

The thumbnail software system then displays the search results and the spatial thumbnails obtained for search results referencing media objects having spatial references (530), e.g., as illustrated in FIG. 4. It will be apparent that searches generally result in an arbitrary number of search results, and that not all search results will necessarily reference spatial information, so the thumbnail software system will not necessarily obtain a spatial thumbnail for all displayed search results.

Figure 6:
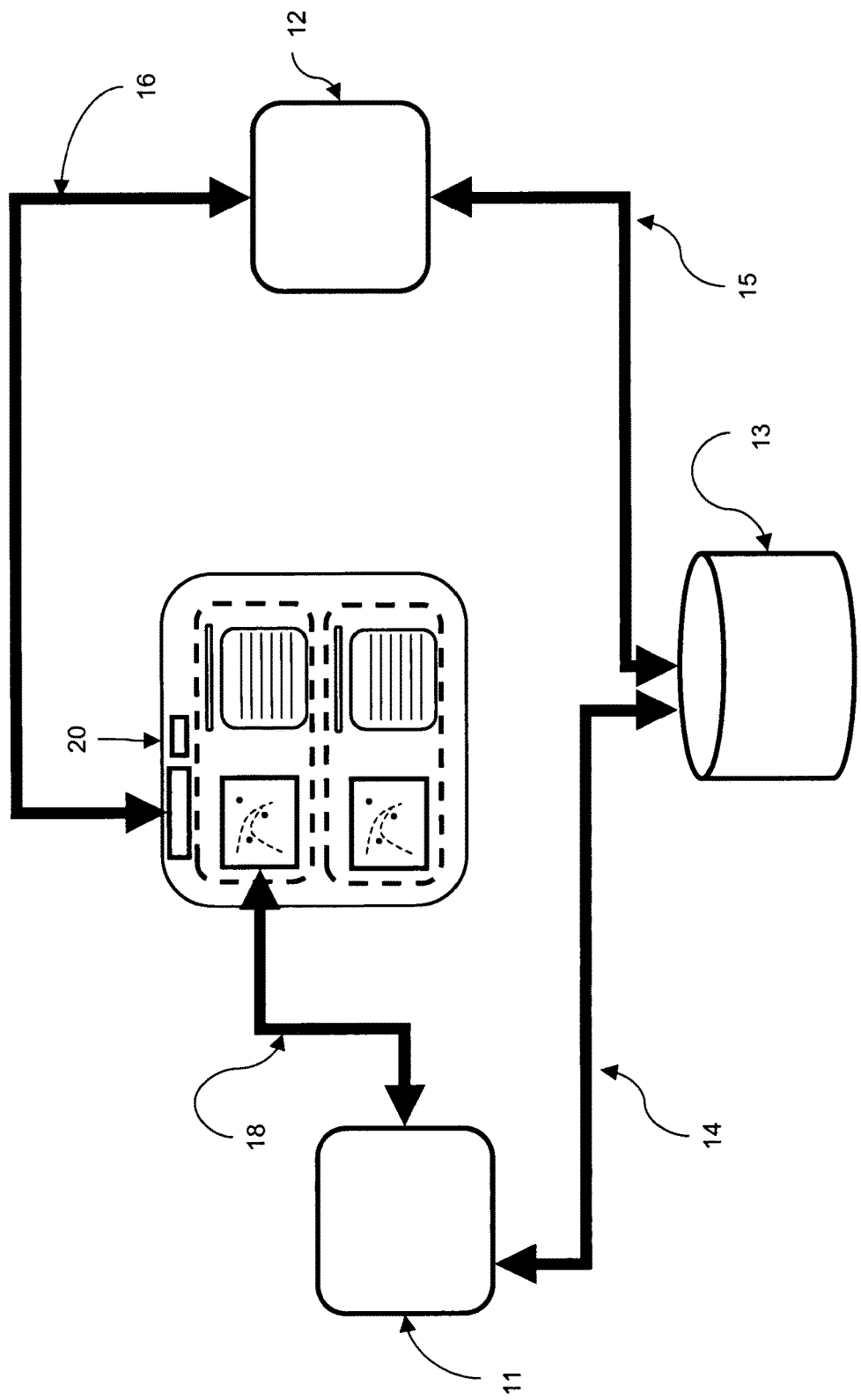
FIG. 6 schematically represents a system for generating spatial thumbnails, executing searches, and generating location-related content for digital media objects.

FIG. 6 schematically illustrates a system for generating spatial thumbnails, executing searches, and generating location-related content for digital media objects. The system includes a thumbnail software subsystem (20), a search engine subsystem (12), a parsing software subsystem (11), and a document repository (13) that stores digital media objects, e.g., a database or the World Wide Web. The thumbnail software subsystem (20) communicates with the search engine subsystem (12) via communication link (16), and communicates with parsing software subsystem (11) via communication link (18). The search engine subsystem (12) communicates with document repository (13) via communication link (15). The parsing software subsystem communicates with document repository (13) via communication link (14).

The thumbnail software system (20) generates a GUI for accepting queries from a user and displaying to the user search results based on the queries, and spatial thumbnails associated with at least some of the search results, e.g., the GUI illustrated in FIG. 4. The thumbnail software system (20) obtains the content for the GUI by interworking with the search engine subsystem (12) and the parsing software system (11). In operation, when the user enters a query into the GUI, the thumbnail software system (20) forwards the query to the search engine subsystem (12) via communication link (16). The search engine subsystem (12) process the query, generates search results based on the query, and transmits the search results to the thumbnail software subsystem (20) via communication link (16). The search results each include a reference to a media object.

Responsive to receiving the search results, the thumbnail software subsystem (20) attempts to obtain a spatial thumbnail for each media object referenced in a search result. The thumbnail software subsystem (20) transmits the references to the media objects referenced in the search results to parsing software subsystem (11) via communication link (18). The parsing software subsystem (11) analyzes the media objects, and generates location-related content for media objects as appropriate, e.g., for media objects that reference locations or spatial relationships. The parsing software subsystem (11) then transmits to the thumbnail software subsystem (20) the location-related content for the media objects referenced by the search results. Depending on its configuration, the parsing software subsystem (11) might not generate location-related content for every media object that reference locations or spatial relationships, for example if the parsing software subsystem (11) determines that the reference is insufficiently relevant to warrant expression in a spatial thumbnail; for such media objects, the parsing software subsystem (11) returns a null result to the thumbnail software subsystem (20).

Based on the location-related content obtained from the parsing software subsystem (11), the thumbnail software subsystem (20) obtains spatial thumbnails for media objects associated with location-related content as described in greater detail herein. The thumbnail software system (20) then displays the search results and the obtained spatial thumbnails to the user via the GUI.

FIG. 7 schematically illustrates a GUI (27) displaying the results of a search performed for the query "tree farm." The GUI (27) includes a text entry box (24) containing the query "tree farm" (23), a "submit" button (25), a plurality of search results that include references to media objects (22), e.g., web pages, summaries of the media objects (26), and a plurality of spatial thumbnails (20) adjacent the corresponding summaries (26) and references (22). As illustrated in FIG. 7, the result for "Bent Tree Farms" does not have an associated spatial thumbnail, and the GUI simply displays a blank space (21) in the area adjacent the summary (26) and reference (22) for that search result, where a spatial thumbnail would otherwise have been displayed.

The query received from a user may come in several forms. Any type of user input that may be transformed into a database query in the commonly used "Structured Query Language" ("SQL") could be a query. Examples include, free-text input, selecting one or more options from a list of options offered to the user, and selecting a variety of different options from different options lists and submitting the combined set of options to the computer system as a query. For example, a web site might offer several "categories" of content that a user can choose amongst by navigating to different links presented in a web page. By navigating through a particular sequence of links, the user constructs a query comprised of the selections made in navigating the links. The resulting query is then processed by the computer system generating the web page, and a set of search results are presented to the user in the resulting web page. The page typically contains means of issuing additional queries to generate additional result sets. Any of these means of entering queries can generate search results accompanied by spatial thumbnails for the media objects referenced in the generated search results.

Some embodiments utilize a web browser user interface. To display spatial thumbnails in a search listing, the user interface display connects together different parts of the system. For example, a listing of search results may be displayed to a user via a web browser that displays HTML. The HTML may be generated by a script that accepts user queries via CGI parameters in the URL that requests the HTML. The script passes the user query to a secondary process that generates the search result listing in a computer readable form, such as an array of data records. The data records typically include several data elements, including a URL to the original media object, a URL to a copy of the media object that the search engine has cached, a excerpt or fragment or other form of summary about the media object, or possibly a URL or other type of reference to such a summary of the media object. The script processes this information to produce an HTML representation that it passes to the user's web browser. The web browser renders the HTML into a visual display. CGI is a common gateway interface and is standard in the art. URL is a universal resource locator and is standard in the art. HTML is the hyper-text markup language and is standard in the art.

The visual display is typically a list of visual arrays arranged in an orderly fashion on the page, such as one item per row or in a grid of boxes stacked on the screen. And for each row or grid cell, information for a specific result is displayed.

Spatial thumbnails can be included in the search result listing by creating the script such that for every element in the array of search results, it includes an HTML IMG tag in the tow or grid cell displaying information for that result. An HTML IMG tag is standard in the art and is an instruction to the web browser that causes the browser to load an image from a source URL. The source URL is designated within the HTML IMG tag. For example, this is an HTML IMG tag that would instruct a web browser to load the image associated with the URL "http://metacarta.com/imagel.png"

<IMG SRC="http://metacarta.com/imagel.png"/>

By including these in the result listing, the script that arranges the search results can request images that may not have been generated yet. This provides an abstraction layer between the script generating the search results display and the thumbnail software system. The image source URLs included in the result listing could be to images that already exist or the system specified by the image source URL may generate the images on the fly.

In order to request a spatial thumbnail of a particular media object, the image source URL must somehow specify or encode a reference to the media object, so the thumbnail software system can interpret the URL request and respond with the right spatial thumbnail. One way of doing this is to pass a URL for the media object in an encoded format inside the image request URL. Here's an example of passing a URL encoded inside of another URL:

<IMG SRC="http://metacarta.com/thumbnail?url=http://news.com/articlel.html"/>

The thumbnail software system can then interpret the "url=" parameter which contains the value "http://news.com/articlel.html" and generate a spatial thumbnail for that media object. If the thumbnail software system determines that a particular media object does not have location-related content associated with it, or that the location related content associated with it is not appropriate for a particular situation, it can respond with a blank image. Such a blank image might be a transparent image that allows the background color of the search result listing's HTML page to show through to the user, or it might simply be white.

Often, the URL for requesting the spatial thumbnail will also allow the requestor to specify additional parameters, such as:

a width and height of the desired image
a designation for a given spatial domain, such as "Earth" or "Mars" so that the thumbnail software system can prepare a map image of the desired spatial domain
a filtering extent, which is a location reference to a location within a given spatial domain.

If a filtering extent is passed, it instructs the thumbnail system to only display locations from the location-related content associated with the media object if those locations are contained within the filtering extent.

a selection of which data layers to use in constructing the map image
a particular color to use for blank images, so that they blend into the HTML page seamlessly.

The value of the blank images is that it allows the script constructing the search results to ignore the possibility that some of the media objects may not get a spatial thumbnail. The script simply causes the browser to request a spatial thumbnail for every result listing, and then allows the thumbnail system to fill in the space with an invisible image if no spatial thumbnail is available for a given media object in the list.

The user query passed to the script may be of a wide variety of forms. For example, a query may be only free text, or it may be a selection from a fixed list of choices. For example, a site may offer users a list of categories of content in a list. By selecting an item from the list, the user issues a query that retrieves a list of one or more items. A query may be a free text query combined with a spatial domain constraint as described in U.S. Pat. No. 7,117,199.

When working with multiple media objects, such as in a search result listing that lists references many media objects, it is sometimes appropriate to generate a spatial thumbnail that depicts location-related content from more than one of the media objects. For example, when displaying a list of search results for a user's query for the word "tree farm" the system can generate a single spatial thumbnail showing locations from the location-related content associated with each of the top five documents.

When generating a spatial thumbnail, the location-related content may contain a large number of locations. By analyzing the media object using either human evaluators or automatic algorithms, the thumbnail software system can decide that a subset of the location-related content is more important or more pertinent to the media object. These locations are said to have higher "relevance," and when generating the spatial thumbnail, the system may choose to only display a subset of the location-related content that is higher relevance than other subsets. By focusing the thumbnail's display on higher relevance location-related content, the system can direct the user's attention to the most important aspects of the location-related content. For example, a document about Japan might also mention Moscow, but only tangentially. By analyzing the relevance of the different locations referenced in the document, the system may decide to show a map image that only covers Japan and excludes Moscow.

The software systems described herein can be run on conventional computers, including memory, storage media, input devices, processors, display devices, and the like.

A number of embodiments of the invention have been described. Nevertheless, it will be understood that various modifications may be made without departing from the spirit and scope of the invention. Accordingly, other embodiments are within the following claims.

The invention claimed is:

1. A method comprising:
   receiving a search query;
   obtaining search results based on the search query,
   wherein the search results comprise one or more geospatial references to at least one media object referenced in the search results;
   obtaining a spatial thumbnail for the at least one media object,
   wherein the spatial thumbnail comprises a representation of an image of a spatial domain encompassing a spatial relationship of one or more location related content corresponding to the one or more geospatial references within the at least one media object,
   wherein obtaining the spatial thumbnail comprises parsing the at least one media object for generation of the one or more location-related content for the at least one media object in an instance when it is determined that the one or more geospatial references is relevant to the spatial thumbnail;
   obtaining a summary of the at least one media object, the summary comprises a summarized description of narrative excerpts from one or more documents associated with the at least one media object;
   determining to display the summary of the at least one media object and the spatial thumbnail.

2. The method of claim 1, wherein the spatial domain is a map encompassing the spatial relationship of the one or more location related content.

3. The method of claim 1, further comprising causing to display an image of the at least one media object or a portion of the at least one media object so as to allow a user to assess, based on an image of the at least one media object or the portion of the at least one media object, whether the at least one media object is relevant to the search query from the user.

4. The method of claim 1, wherein the spatial thumbnail allows a user to assess whether the at least one media object is relevant to the search query from the user.

5. The method of claim 1, further comprising generating the one or more location-related content associated with the at least one media object by:
   identifying the one or more geospatial references within the at least one media object;

associating one or more locations with the one or more identified geospatial references, the one or more locations being represented by one or more sets of coordinates of a coordinate system; and encoding the one or more set of the coordinates with the one or more location-related content.

6. The method of claim 1, wherein the one or more location-related content comprises one or more location references such as a name, a latitude-longitude coordinate, an identification number of the at least one media object, or a combination thereof.

7. The method of claim 1, wherein the spatial thumbnail comprises one or more markers which represent one or more locations described or referenced by the at least one media object.

8. An apparatus comprising a processor and at least one non-transitory memory including computer program instructions, the at least one non-transitory memory and the computer program instructions configured to, with the processor, cause the apparatus to:

receive a search query;
obtain search results based on the search query,
wherein the search results comprise one or more geospatial references to at least one media object referenced in the search results;
obtain a spatial thumbnail for the at least one media object,
wherein the spatial thumbnail comprises a representation of an image of a spatial domain encompassing a spatial relationship of one or more location related content corresponding to the one or more geospatial references within the at least one media object,
wherein obtaining the spatial thumbnail comprises parsing the at least one media object for generation of the one or more location-related content for the at least one media object in an instance when it is determined that the one or more geospatial references is relevant to the spatial thumbnail;
obtain a summary of the at least one media object, the summary comprises a summarized description of narrative excerpts from one or more documents associated with the at least one media object;
determine to display the summary of the at least one media object and the spatial thumbnail.

9. The apparatus of claim 8, wherein the spatial domain is a map encompassing the spatial relationship of the one or more location related content.

10. The apparatus of claim 8, wherein the at least one non-transitory memory and the computer program instructions are further configured to, with the processor, cause the apparatus to:

cause to display an image of the at least one media object or a portion of the at least one media object so as to allow a user to assess, based on an image of the at least one media object or the portion of the at least one media object, whether the at least one media object is relevant to the search query from the user.

11. The apparatus of claim 8, wherein the spatial thumbnail allows a user to assess whether the at least one media object is relevant to the search query from the user.

12. The apparatus of claim 8, wherein the at least one non-transitory memory and the computer program instructions are further configured to, with the processor, cause the apparatus to:

identify the one or more geospatial references within the at least one media object;

associate one or more locations with the one or more identified geospatial references, the one or more locations being represented by one or more sets of coordinates of a coordinate system; and encode the one or more set of the coordinates with the one or more location-related content.

13. The apparatus of claim 8, wherein the one or more location-related content comprises one or more location references such as a name, a latitude-longitude coordinate, an identification number of the at least one media object, or a combination thereof.

14. The apparatus of claim 8, wherein the spatial thumbnail comprises one or more markers which represent one or more locations described or referenced by the at least one media object.

15. A computer program product comprising a non-transitory computer readable storage medium having one or more sequences of one or more instructions which, when executed by one or more processors, cause an apparatus to at least perform the following:

receive a search query;
obtain search results based on the search query,
wherein the search results comprise one or more geospatial references to at least one media object referenced in the search results;
obtain a spatial thumbnail for the at least one media object,
wherein the spatial thumbnail comprises a representation of an image of a spatial domain encompassing a spatial relationship of one or more location related content corresponding to the one or more geospatial references within the at least one media object,
wherein obtaining the spatial thumbnail comprises parsing the at least one media object for generation of the one or more location-related content for the at least one media object in an instance when it is determined that the one or more geospatial references is relevant to the spatial thumbnail;
obtain a summary of the at least one media object, the summary comprises a summarized description of narrative excerpts from one or more documents associated with the at least one media object;
determine to display the summary of the at least one media object and the spatial thumbnail.

16. The computer program product of claim 15, wherein the spatial domain is a map encompassing the spatial relationship of the one or more location related content.

17. The computer program product of claim 15, wherein the non-transitory computer readable storage medium having the one or more sequences of one or more instructions which, when executed by the one or more processors, further causes the apparatus to at least perform the following:

cause to display an image of the at least one media object or a portion of the at least one media object so as to allow a user to assess, based on an image of the at least one media object or the portion of the at least one media object, whether the at least one media object is relevant to the search query from the user.

18. The computer program product of claim 15, wherein the spatial thumbnail allows a user to assess whether the at least one media object is relevant to the search query from the user.

19. The computer program product of claim 15, wherein the non-transitory computer readable storage medium having the one or more sequences of one or more instructions which, when executed by the one or more processors, further causes the apparatus to at least perform the following:

identify the one or more geospatial references within the at least one media object;

associate one or more locations with the one or more identified geospatial references, the one or more locations being represented by one or more sets of coordinates of a coordinate system; and encode the one or more set of the coordinates with the one or more location-related content.

20. The computer program product of claim 15, wherein the one or more location-related content comprises one or more location references such as a name, a latitude-longitude coordinate, an identification number of the at least one media object, or a combination thereof.

* * * * *